(12) United States Patent
Dujmovic et al.

(10) Patent No.: US 9,280,554 B2
(45) Date of Patent: Mar. 8, 2016

(54) USING CONFIDENCE VALUES FOR SYNCHRONIZING FILE SYSTEMS

(71) Applicant: Oracle International Corporation, Redwood Shores, CA (US)

(72) Inventors: Ivo Dujmovic, Redwood City, CA (US); Satya Prakash Bandla, Andhra Pradesh (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/802,785

(22) Filed: Mar. 14, 2013

(65) Prior Publication Data

US 2014/0188793 A1 Jul. 3, 2014

Related U.S. Application Data

(60) Provisional application No. 61/707,823, filed on Sep. 28, 2012, provisional application No. 61/707,827, filed on Sep. 28, 2012, provisional application No. 61/707,840, filed on Sep. 28, 2012.

(51) Int. Cl.

| | |
|---|---|
| *G06F 17/00* | (2006.01) |
| *G06F 7/00* | (2006.01) |
| *G06F 17/30* | (2006.01) |
| *G06F 9/445* | (2006.01) |
| *G06F 9/44* | (2006.01) |

(52) U.S. Cl.
CPC ............ *G06F 17/30174* (2013.01); *G06F 8/65* (2013.01); *G06F 8/67* (2013.01); *G06F 8/68* (2013.01); *G06F 17/30595* (2013.01)

(58) Field of Classification Search
CPC ........................................................ G06F 8/60
USPC ......................................................... 707/611
See application file for complete search history.

(56) References Cited

U.S. PATENT DOCUMENTS

| | | | |
|---|---|---|---|
| 5,227,967 A | 7/1993 | Bailey | |
| 5,315,709 A | 5/1994 | Alston et al. | |
| 5,440,743 A | 8/1995 | Yokota et al. | |
| 5,448,727 A | 9/1995 | Annevelink | |

(Continued)

OTHER PUBLICATIONS

"Oracle OLAP", Oracle, Jan. 3, 2012, 2 pages url: http://www.oracle.com/technetwork/database/options/olap/index.html.

(Continued)

*Primary Examiner* — Pavan Mamillapalli
(74) *Attorney, Agent, or Firm* — Vista IP Law Group, LLP

(57) ABSTRACT

A system, computer implemented method, and computer program product for analyzing an installation to determine a file system promotion path during an online patching cycle. The method commences by identifying an initial file system and a shadow file system, the shadow file system being at least some duration older than the initial run file system, then analyzing a history of events that occurred in or on the installation during the duration to determine a degree of confidence. Based on the degree of confidence, then selecting the initial file system to be used on the online patching cycle when the confidence value is equal or above a threshold, or selecting the shadow file system to be used in the online patching cycle when the confidence value is below a threshold. The history of events is recorded in forms of a patch list, a log file, or a list of configuration events.

20 Claims, 15 Drawing Sheets

(56) References Cited

U.S. PATENT DOCUMENTS

| | | | |
|---|---|---|---|
| 5,555,388 | A | 9/1996 | Shaughnessy |
| 5,608,903 | A | 3/1997 | Prasad et al. |
| 5,640,550 | A | 6/1997 | Coker |
| 5,717,924 | A | 2/1998 | Kawai |
| 5,978,426 | A | 11/1999 | Glover et al. |
| 6,016,497 | A | 1/2000 | Suver |
| 6,122,630 | A | 9/2000 | Strickler et al. |
| 6,122,640 | A | 9/2000 | Pereira |
| 6,138,112 | A | 10/2000 | Slutz |
| 6,173,313 | B1 | 1/2001 | Klots et al. |
| 6,268,850 | B1 | 7/2001 | Ng |
| 6,304,867 | B1 | 10/2001 | Schmidt |
| 6,324,535 | B1 | 11/2001 | Bair et al. |
| 6,363,387 | B1 | 3/2002 | Ponnekanti et al. |
| 6,460,055 | B1 | 10/2002 | Midgley et al. |
| 6,480,848 | B1 | 11/2002 | DeKimpe et al. |
| 6,519,613 | B1 | 2/2003 | Friske et al. |
| 6,598,059 | B1 | 7/2003 | Vasudevan et al. |
| 6,611,848 | B1 | 8/2003 | Bradley |
| 6,633,870 | B1 | 10/2003 | Bradley |
| 6,633,883 | B2 | 10/2003 | Koskas |
| 6,681,225 | B1 | 1/2004 | Uceda-Sosa et al. |
| 6,745,209 | B2 | 6/2004 | Holenstein et al. |
| 6,769,124 | B1 | 7/2004 | Schoening et al. |
| 6,801,983 | B2 | 10/2004 | Abe et al. |
| 6,834,290 | B1 | 12/2004 | Pugh et al. |
| 6,965,899 | B1 | 11/2005 | Subramaniam et al. |
| 7,028,057 | B1 | 4/2006 | Vasudevan et al. |
| 7,080,371 | B1 | 7/2006 | Arnaiz et al. |
| 7,237,238 | B2* | 6/2007 | Peppers .............. G06F 8/60 717/169 |
| 7,310,653 | B2 | 12/2007 | Coyle et al. |
| 7,350,191 | B1 | 3/2008 | Kompella et al. |
| 7,421,458 | B1 | 9/2008 | Taylor et al. |
| 7,574,461 | B1 | 8/2009 | Armorer et al. |
| 7,603,669 | B2* | 10/2009 | Curtis et al. .............. 717/174 |
| 7,689,587 | B1 | 3/2010 | Tiruveedi et al. |
| 7,693,889 | B1 | 4/2010 | Armorer et al. |
| 8,087,013 | B2 | 12/2011 | Kelly et al. |
| 8,495,612 | B2* | 7/2013 | Bertrand ............ G06F 8/65 717/101 |
| 8,793,230 | B2 | 7/2014 | Engelko et al. |
| 9,043,778 | B2* | 5/2015 | Lin et al. ............ 717/170 |
| 2002/0019972 | A1 | 2/2002 | Grier et al. |
| 2002/0087271 | A1 | 7/2002 | Rozenshtein et al. |
| 2002/0188600 | A1 | 12/2002 | Lindsay et al. |
| 2003/0041127 | A1* | 2/2003 | Turnbull .............. 709/220 |
| 2003/0154216 | A1 | 8/2003 | Arnold et al. |
| 2003/0217069 | A1 | 11/2003 | Fagin et al. |
| 2003/0229610 | A1 | 12/2003 | Van Treeck |
| 2004/0064487 | A1 | 4/2004 | Nguyen et al. |
| 2005/0015376 | A1* | 1/2005 | Fraser et al. .............. 707/10 |
| 2005/0108733 | A1 | 5/2005 | Bermudez et al. |
| 2005/0149475 | A1 | 7/2005 | Chkodrov et al. |
| 2005/0149920 | A1* | 7/2005 | Patrizi et al. .............. 717/168 |
| 2005/0154695 | A1 | 7/2005 | Gonzalez et al. |
| 2006/0015528 | A1 | 1/2006 | Hejlsberg et al. |
| 2006/0085457 | A1 | 4/2006 | Gelfand |
| 2006/0085465 | A1 | 4/2006 | Nori et al. |
| 2006/0117029 | A1 | 6/2006 | Yingst |
| 2006/0130040 | A1 | 6/2006 | Subramanian et al. |
| 2006/0242381 | A1* | 10/2006 | Shatskih et al. .............. 711/170 |
| 2007/0038590 | A1 | 2/2007 | Vijayan et al. |
| 2007/0038651 | A1 | 2/2007 | Bernstein et al. |
| 2007/0061487 | A1 | 3/2007 | Moore |
| 2007/0079140 | A1 | 4/2007 | Metzger et al. |
| 2007/0106701 | A1 | 5/2007 | Periyasamy |
| 2007/0156849 | A1 | 7/2007 | Becker |
| 2007/0219951 | A1 | 9/2007 | Ahmed et al. |
| 2008/0098046 | A1 | 4/2008 | Alpern |
| 2008/0201701 | A1 | 8/2008 | Hofhansl et al. |
| 2008/0243966 | A1 | 10/2008 | Croisettier |
| 2009/0006884 | A1 | 1/2009 | Cahill |
| 2010/0110474 | A1 | 5/2010 | Coulter et al. |
| 2010/0281458 | A1 | 11/2010 | Paladino |
| 2012/0222025 | A1 | 8/2012 | Pandit |
| 2013/0104115 | A1* | 4/2013 | Bertrand .............. G06F 8/65 717/170 |
| 2013/0132936 | A1* | 5/2013 | Wang .............. G06F 21/57 717/170 |
| 2014/0344798 | A1* | 11/2014 | Sasaki .............. G05B 19/0426 717/170 |

OTHER PUBLICATIONS

"Introduction to Analytic Workspaces", Oracle OLAP DML Reference, 11g Release 1 (11.1), Part No. B28126-03, Oracle, Mar. 18, 2013, 2 pages url: http://docs.oracle.com/cd/B28359_01/olap.111/b28126/dml_basics004.htm.

Non-final Office Action dated Feb. 12, 2015 for U.S. Appl. No. 13/802,774.

Alan Choi, "Online Application Upgrade Using Edition-Based Redefinition", 2009, ACM.

Non-final Office Action dated Feb. 12, 2015 for U.S. Appl. No. 13/802,791.

Non-final Office Action dated Mar. 27, 2015 for U.S. Appl. No. 13/802,771.

Non-final Office Action dated Mar. 8, 2010 for U.S. Appl. No. 11/875,478.

Advisory Action dated Jan. 26, 2010 for U.S. Appl. No. 11/444,571.

Final Office Action dated Aug. 30, 2010 for U.S. Appl. No. 11/875,478.

Notice of Allowance dated Mar. 21, 2011 for U.S. Appl. No. 11/444,571.

Final Office Action dated Dec. 7, 2010 for U.S. Appl. No. 11/201,797.

Final Office Action dated Sep. 8, 2011 for U.S. Appl. No. 11/801,495.

Non-final Office Action dated Jan. 31, 2012 for U.S. Appl. No. 11/875,478.

Final Office Action dated Jan. 25, 2012 for U.S. Appl. No. 11/201,797.

Non-final Office Action dated Jun. 27, 2012 for U.S. Appl. No. 11/875,478.

Final Office Action dated Jan. 29, 2013 for U.S. Appl. No. 11/875,478.

Advisory Action dated Mar. 8, 2013 for U.S. Appl. No. 11/875,478.

Final Office Action dated Mar. 29, 2013 for U.S. Appl. No. 11/801,495.

Notice of Allowance dated Jun. 12, 2013 for U.S. Appl. No. 11/875,478.

Notice of Allowance dated Jan. 16, 2015 for U.S. Appl. No. 13/802,780.

Non-final Office Action dated Jul. 31, 2014 for U.S. Appl. No. 13/802,794.

Final Office Action dated Jan. 16, 2015 for U.S. Appl. No. 13/802,794.

Non-final Office Action dated May 21, 2015 for U.S. Appl. No. 13/802,794.

Final Office Action dated Jul. 8, 2015 for U.S. Appl. No. 13/802,774.

Final Office Action dated Jul. 14, 2015 for U.S. Appl. No. 13/802,791.

Lassen et al. Experiences with object oriented development in PL!SQL, Center for Object Technology COT/4-18-V1.4, 2000.

Object Cache Navigation, Oracle Call Interface PRogrammer's Guide, Release 2 (9.2), Part No. A96584-10, 1996,2002.

Date et al, A Guide to SQL/DS, 1989, Addison-Wesley, Chapter 10.

Quest Software, Inc., LiveReorg.RTM., "Reorganization for the 24.times.7, Database," 2001.

Paapanen, Eric et al., "Oracle Database Application Developer's Guide-Large Objects", 10g Release 1 (10.1), Part No. B1079601, Apr. 21, 2008, 668 pages.

Smith, Jeff, "The Shortest, Fastest, and Easiest way to compare two tables in SQL Server: Union!", Jeffs SQL Server Blog 10, Apr. 22, 2008, 45 pages.

T-SQL, "sp_rename (T-SQL)", printed Apr. 22, 2008, 3 pages.

Scott Ambler et al., "Refactoring Databases: Evolutionary Database Design", Mar. 3, 2006, 7 pages.

(56) References Cited

OTHER PUBLICATIONS

Tom Davidson, Managing Schema Changes (Part 2), MSSQL Server Development Customer Advisory Teach, Mar. 31, 2006, Microsoft Corporation, Nov. 19, 2000, http://blgs.msdn.com/squlcat/archive/2006/03/31/566046.aspx, 11 pages.

Notice of Allowance dated May 11, 2015 for U.S. Appl. No. 13/802,780.

Final Office Action dated Oct. 23, 2015 for related U.S. Appl. No. 13/802,771.

Notice of Allowance and Fees Due dated Nov. 25, 2015 for related U.S. Appl. No. 13/802,774.

Non-final Office Action dated Dec. 2, 2015 for related U.S. Appl. No. 13/802,791.

Notice of Allowance and Fee(s) Due dated Jan. 6, 2016 for related U.S. Appl. No. 13/802 794, 6 pages.

\* cited by examiner

USING CONFIDENCE VALUES FOR SYNCHRONIZING FILE SYSTEMS

RELATED APPLICATIONS

The present application claims the benefit of priority to U.S. Provisional Patent Application Ser. No. 61/707,823, entitled "ONLINE PATCHING ORCHESTRATION", filed on Sep. 28, 2012, and U.S. Provisional Patent Application Ser. No. 61/707,827, entitled "CONFIGURATION CHANGE DETECTION AND PROPAGATION", filed on Sep. 28, 2012, and U.S. Provisional Patent Application Ser. No. 61/707,840, entitled "SYNCHRONIZING DOMAIN CONFIGURATION PARAMETERS", filed on Sep. 28, 2012, which are all hereby incorporated by reference in their entireties; and the present application is related to co-pending U.S. patent application Ser. No. 13/802,771, entitled "USING A DATA DICTIONARY TO DETERMINE AN UPGRADE EDITION OF A RELATIONAL DATABASE TABLE", filed on even date herewith, which is hereby incorporated by reference in its entirety; and the present application is related to co-pending U.S. patent application Ser. No. 13/802,774, entitled "ONLINE UPGRADING OF A DATABASE ENVIRONMENT USING TRANSPARENTLY-PATCHED SEED DATA TABLES", filed on even date herewith, which is hereby incorporated by reference in its entirety; and the present application is related to co-pending U.S. patent application Ser. No. 13/802,780, entitled "TRANSPARENTLY UPGRADING DERIVED DATABASE OBJECTS", filed on even date herewith, which is hereby incorporated by reference in its entirety; and the present application is related to co-pending U.S. patent application Ser. No. 13/802,791, entitled "REDUCING DOWNTIME DURING UPGRADES OF INTERRELATED COMPONENTS IN A DATABASE SYSTEM", filed on even date herewith, which is hereby incorporated by reference in its entirety; and the present application is related to co-pending U.S. patent application Ser. No. 13/802,794, entitled "SYNCHRONIZATION OF CONFIGURATION CHANGES BETWEEN APPLICATIONS AND THEIR PLATFORMS", filed on even date herewith, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of reducing downtime during upgrade of database system environments and more particularly to techniques for analyzing a file system state to determine the nature of upgrading operations.

BACKGROUND

In modern database systems, file systems are often used in addition to the database tables. File systems—in particular partitions of a file system—typically serve as a repository for application code and application-specific configuration settings. Vendors of such database systems and vendors of applications that run in conjunction with other database components periodically release upgrades in the form of entirely updated partitions of a file system (e.g., a "major release"), or the vendors may periodically release a patch set covering only "one-off" fixes, or patches covering only a portion of the release (e.g., a "partial release patch set"). System administrators may (or may not) observe the vendor's recommendations for applying patches in a timely fashion (e.g., synchronous or nearly synchronous with patch releases), or they may choose to apply patches in a fashion determined by the system administrators, or, the system administrators may defer applying any or all patches. Further, in some cases, system administrators may make changes to the file system in the form of changes to application code and/or changes to application-specific configuration settings that are not precisely in synchronicity with the vendor's patch releases. Still further, in some cases, system administrators may make changes to the file system, which changes are repugnant with respect to the vendor's patch releases. This results in the situation where the file system may or may not be in a "known" state prior to an upgrade. This creates problems as follows:

When it comes time to upgrade (e.g., by upgrading to a major release) use of legacy techniques force the vendors to one of two choices, both of which are at least partially undesirable and/or destructive:

Choice 1: Completely install the factory-fresh updated portions of a file system.
  Desired Aspects: The factory-fresh updated portions of a file system are in a known state, thus leading to a stable configuration.
  Undesired Aspects: The system administrators may have made configuration or code changes which would be overwritten or otherwise destroyed by the factory-fresh installation.

Choice 2: Apply patches on top of the configuration or code changes made by the system administrators:
  Desired Aspects: Changes made by the system administrators can sometimes be retained.
  Undesired Aspects: The application of a patch to a file system that is in an unknown state (e.g., from unknown changes on top of an installation) often results in a system of indeterminate stability.

The problem is further exacerbated when the file system is deployed in the context of a database system or an application system that is to be upgraded concurrently with the upgrade of the file system. Yet, using techniques disclosed herein, it is possible to achieve desired aspects without incurring undesired aspects. For example, in some cases it is possible to upgrade while preserving the configuration or code changes made by the system administrators (thus retaining the configuration intentions of the system administrators). In some cases, the changes made by the system administrators can be classified as "don't care", or "default override", or can be classified as otherwise benign with respect to the stability of the resulting upgraded system, thus enabling an upgrade while preserving the configuration or code changes made by the system administrators.

What's needed to accomplish these improvements are multiple techniques for upgrading a file system that considers cases when the state of the file system to be upgraded is not factory-fresh, yet it can be unequivocally determined to be a sufficiently stable system so as to be deemed a viable candidate for non-destructive patching.

Unfortunately, legacy techniques do not perform steps for analyzing a file system state to determine a confidence score, nor do legacy techniques perform steps for classifying a file system state to determine a sequence of rebuilding operations. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for analyzing a file system state to determine a promotion path during an online patching cycle.

The method commences by identifying an initial file system and a shadow file system, the shadow file system being at least some duration older than the initial run file system, then analyzing a history of events that occurred in or on the installation during the duration to determine a degree of confidence. Based on the degree of confidence, then selecting the initial file system to be used on the online patching cycle when the confidence value is equal or above a threshold, or selecting the shadow file system to be used in the online patching cycle when the confidence value is below a threshold. The history of events is recorded in forms of a patch list, and/or a patching table, and/or configuration logs, and/or a log file, and/or a list of configuration events or any combinations of the foregoing.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1A:
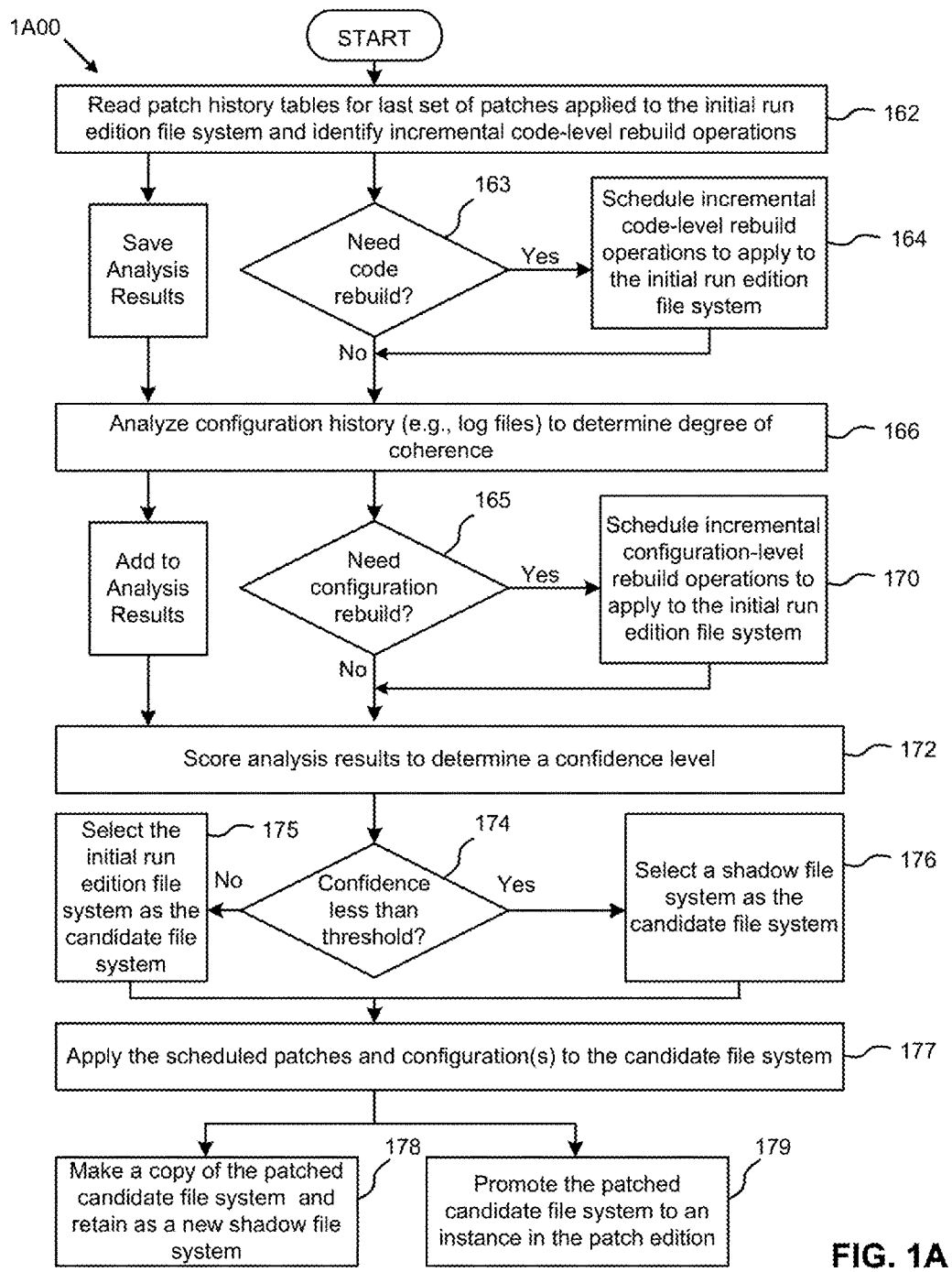
FIG. 1A is a diagram of a sample flow for analyzing a file system state to determine a promotion path during an online patching cycle, according to some embodiments.

Some embodiments of the present disclosure are directed to an improved approach for implementing analyzing a file system state to determine a promotion path during an online patching cycle. More particularly, disclosed herein are exemplary environments, methods, and systems for analyzing a file system state to determine a confidence value.

OVERVIEW

Described herein-below and in the accompanying figures are scalable methods and apparatus for implementing analyzing a file system state to determine a promotion path during an online patching cycle.

In modern computing environment settings (e.g., commercial mission-critical systems, operational command and control, etc.), system downtime or other outages due to upgrading (e.g., file system patching, file system rebuilding, etc.) is a major concern in the design of enterprise-wide infrastructure and mission-critical systems. System downtime is especially serious for installations that are configured as a centralized installation, in turn serving many distributed installations. System outages can impact all operations, and system outages often incur great cost when the system outage interferes with customer-related interactions (e.g., sales, service, payments, etc.) or another core business activity (e.g., incoming inspection, manufacturing, etc.). The herein-disclosed techniques for upgrades of installation-wide infrastructure (e.g., including patches or upgrades of software (e.g., software applications and/or software application services, upgrades of file system format and/or content, etc.) facilitate the trend to deploying fewer enterprise-wide sites and fewer installations of mission-critical systems without adversely impacting business activities that rely on nearly 100% uptime of their corresponding computing systems.

In particular, the upgrade techniques disclosed herein include a set of features known as "File System Editioning". File System Editioning enables application patches to be applied with dramatically reduced downtime by executing database patch actions on a "patch edition" of the runtime system. While an online patch is executing (e.g., patching the application code and patching the application load data), the production application remains available and fully functional. Moreover, use of the herein-disclosed techniques serve to transparently perform an upgrade of a computing environment that includes an upgrade of both application code and application load data, and without the need for application programmers to write application code to manage upgrades.

As a part of implementing features known as "File System Editioning", the figures and discussions below disclose techniques for upgrading a file system, which techniques considers cases when the state of the file system to be upgraded is not factory-fresh, yet using the herein-disclosed techniques the file system can be unequivocally determined to be in a sufficiently stable state so as to be deemed a viable candidate for non-destructive patching.

File System Editioning can include any one or more of several file system synchronization techniques. Strictly as examples, file system synchronization techniques can comprise a complete replacement form of synchronization (incurring commensurate resource utilization and latencies), or a light-weight synchronization, or, in some cases, a file system synchronization technique might involve merely configuration change detection synchronization. One or another or combinations of the aforementioned techniques can be used, responsive to analysis of the subject file system states, and/or a history of patch operations, and/or a history of configuration change operations.

One skilled in the art can recognize that in the context of an editioned file system, there are to be two copies of a file system during each upgrade cycle:

A file system that is in a known state since it has been factory-delivered, and has been subjected only to factory-provided patches using factory-authorized patch code, drivers and sequences, and A file system that was (in at least at one period of time) in a known state, and which has since been the subject of updates, possibly including updates that were not factory-recommended.

Concepts of a Maintenance Patch Set and a Single Patch.

A single patch (aka "one-off") is a delivery vehicle for an atomic behavior change. To implement a one-off behavior change, all the code and data (e.g., user interface, business logic, data model, seed data, data transformation logic, etc.) pertaining to the atomic behavior change is changed contemporaneously. Patch sets are a convenience to aggregate a set of behavior changes such that only a single step (e.g., "atomic") change action delivers the desired new behavior changes.

DEFINITIONS

Some of the terms used in this description are defined below for easy reference. The presented terms and their respective definitions are not rigidly restricted to these definitions—a term may be further defined by the term's use within this disclosure.

The term "incremental code-level rebuild" refers to a process of applying patches to software application code files, which files are part of a file system. Some patch artifacts are merely copied to file system. Others are also loaded into a database (e.g., seed data), and some others transform data in database (e.g., via transformation and/ or upgrade scripts). Still others load code into the database (e.g., plsql and Java). Another set of artifacts are used to generate other code. For example some C code libraries are uploaded into other shared objects, or executables which are then relinked. Or for some code (e.g., Java Server Pages are compiled on a target installation).

The term "incremental configuration-level rebuild" refers to a process of applying patches to configurations which may be stored in data files, which files are part of a file system.

The term "shadow file system" refers to a secondary file system that was logically equivalent to the primary file system at some point in the past.

The term "logic" means any combination of software or hardware that is used to implement all or part of the embodiments of the present disclosure.

A "module" includes any mix of any portions of computer memory and any extent of circuitry including hardwired logic or circuitry embodied as a processor.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A is a diagram of a sample flow 1A00 for analyzing a file system state to determine a promotion path during an online patching cycle. As an option, the present sample flow 1A00 may be implemented in the context of the architecture and functionality of the embodiments described herein. Also, the sample flow 1A00 or any aspect therein may be implemented in any desired environment.

The flow as shown commences with a patch set analysis (see operation 162) to determine the code-level state of a given file system. It might be determined that the given file system should receive code-level incremental patches (see decision 163), in which case certain code-level rebuild operations are scheduled (see operation 164) This operation 164 applies the identified patches (from operation 162) to the patch edition file system. The patch history tables are updated to reflect that those patches have been applied. Note that two file systems are maintained concurrently, and alternate or ping/pong between which of the two file systems is defined and used as a run edition file system versus which of the two file systems is used as a patch edition file system (see FIG. 5A-FIG. 5E). Continuing, the flow proceeds with configuration change detection or other form of a configuration history analysis (see operation 166) to determine the configuration history of a given file system.

Some environments may support a real-time configuration change facility. For example, when an application configuration change occurs on a run file system, a flag is set to indicate that a such a configuration change has occurred, and that change map propagate further configuration changes and so on. Change occur in real time, and corresponding flags are set in real-time, and thus, in real-time, it might be determined that the given file system should receive configuration-level incremental patches (see decision 165), in which case certain configuration-level rebuild operations are scheduled (see operation 170). Various techniques pertaining to tracking and propagating configuration changes are further discussed in FIG. 4B.

The flow further continues to score the analysis results (see operation 172) from operation 162 and from operation 166 in order to determine a value comprising a confidence level (see operation 172). In some cases the analysis results from operation 162 and from operation 166 might indicate that the given file system contains only changes deemed as "don't care" changes, or "default override" changes, or can be classified as otherwise benign with respect to the stability of the resulting system, and thus the aforementioned scheduled operations (e.g., code-level rebuild operations, configuration-level rebuild operations) can be applied to the given file system, resulting in an upgraded file system having a known state.

In some cases, the analysis results from operation 162 and from operation 166 might indicate that the given file system contains unknown changes or other changes deemed as non-benign to the stability of the resulting system, and thus the aforementioned scheduled operations (e.g., code-level rebuild operations, configuration-level rebuild operations) if applied, would result in an upgraded file system having an unknown (and possibly unstable) state. In such a situation where the confidence level is below a threshold (see decision 174), a shadow file system (e.g., a file system of known state) is selected (see operation 176), and some or all of the aforementioned scheduled operations (e.g., code-level rebuild operations, configuration-level rebuild operations) can be applied (see operation 177) to the shadow file system, resulting in an upgraded file system having a known state, and which can be saved for a later cycle as a copy (see operation 178) and promoted as a patched candidate file system (see operation 179). In the other branch of decision 174, the initial run edition is selected (see operation 175) which then becomes the subject of scheduled patches (see operation 177).

The file system upgrade operations and/or any portion of the sample flow 1A00 might be performed in the environment of an editioned database system installation, which is now briefly discussed.

Figure 1B:
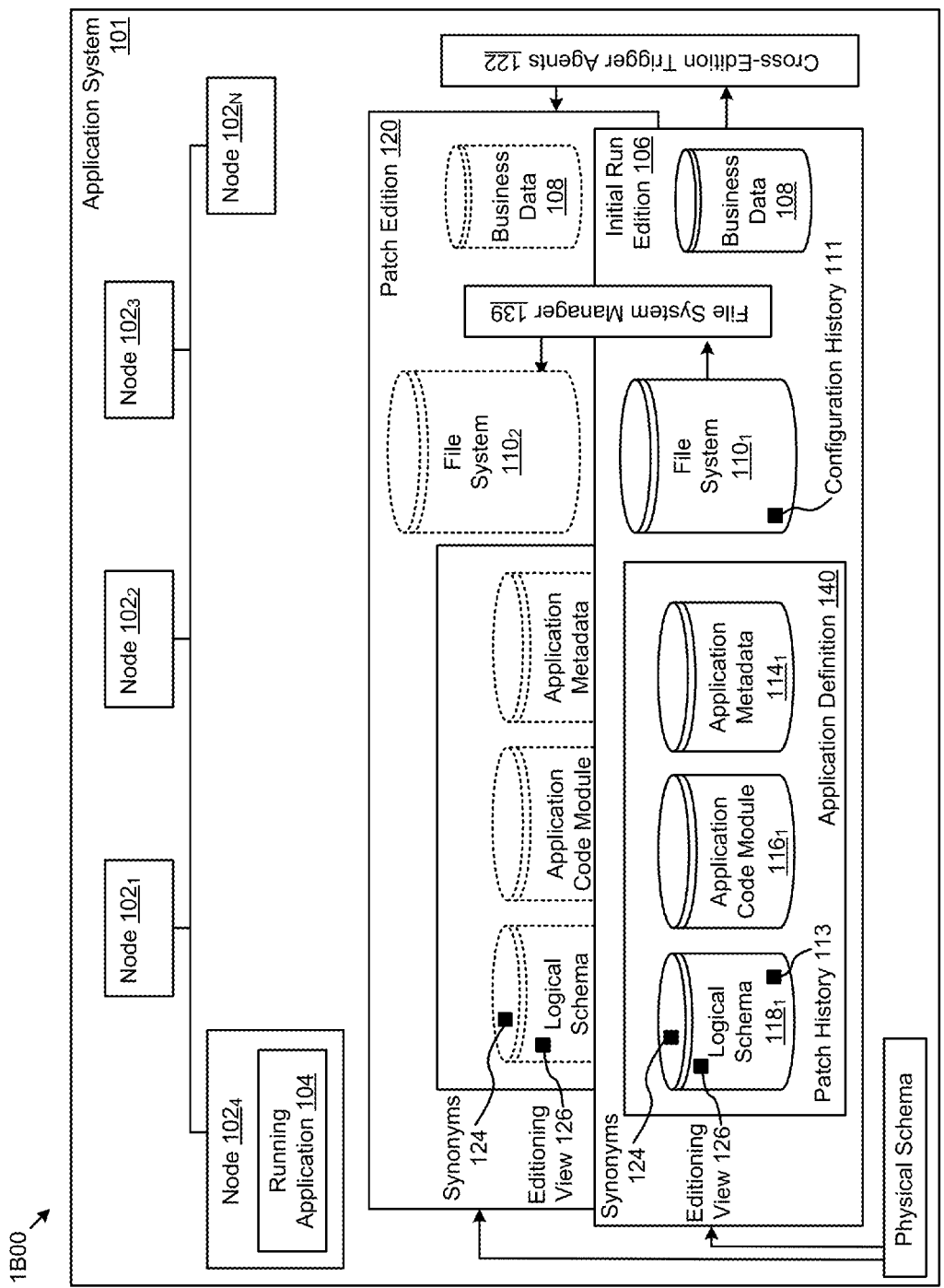
FIG. 1B is a diagram of an editioned database system installation in which can be practiced techniques for analyzing a file system state to determine a promotion path during an online patching cycle, according to some embodiments.

FIG. 1B is a diagram of an editioned database system installation 1B00 in which can be practiced techniques for analyzing a file system state to determine a promotion path during an online patching cycle. As an option, the present editioned database system installation 1B00 may be implemented in the context of the architecture and functionality of the embodiments described herein. Also, the editioned database system installation 1B00 or any aspect therein may be implemented in any desired environment.

The depiction of the installation 1B00 introduces several concepts as shown and described herein. As shown, the installation comprises an application system 101 (e.g., a cluster environment, a portion of a database engine, etc.) which in turn comprises computing nodes (e.g., node $102_1$, node $102_2$, node $102_3$, node $102_4$, node $102_N$, etc.) any of which computing nodes can communicate with any other of the computing nodes. A software application (e.g., running software application 104) executes on a computing node and accesses stored data (e.g., business data 108), and one or more instances of a file system 110). A software application can also access stored data in various application-specific embodiments, (e.g., application metadata, application code modules, and logical schema).

The application code modules 116 serves to store one or more copies of the software application, while the application metadata (e.g., application metadata $114_1$ as shown, application metadata of the patch edition, etc.) serves to store data that is specific to the application (e.g., disjoint from the business data 108). Further, the application metadata can comprise application-specific data in the form of seed data, which can be used by the application to initialize data structures (e.g., screens, forms, menus, etc.) used by a running software application.

The application code modules (e.g., application code modules $116_1$) may be a copy of a portion of file system 110 or may be a reference (e.g., a link or a name) referring to a portion of file system 110.

Concept of Editioning

A particular collection of interrelated components in a database system (e.g., application metadata 114, application code modules 116, logical schema 118, business data 108, one or more instances of a file system 110, etc.) can be amalgamated into an "edition" (e.g., an initial run edition 106), which edition can them be subjected to transformations (e.g., data copies, data references, data conversions, etc.) into one or more other editions (e.g., patch edition 120), as shown.

In order to facilitate for reducing downtime during upgrades of interrelated components in a database system, the collection of interrelated components are handled using the techniques disclosed herein. Strictly as an introductory example, an instance of a running software application can access an initial run edition, or an instance of a running software application can access a patch edition. Various techniques for managing the timing and type of access are provided for by the editioning view 126 and by use of synonyms 124. For example, a synonym can be modified to refer to a logical schema of the initial run edition, or a synonym can be modified to refer to a logical schema of a patch edition.

As can be recognized by those skilled in the art, a system administrator or a first instance of a running software application can access and make changes to an initial run edition, and such changes can be detected and propagated to a patch edition using the cross-edition triggers 122. Changes pertaining to files or objects stored in the file system might affect the file system $110_1$, and such changes can be propagated to the patch edition file system (e.g., file system $110_2$) using a file system manager 139. Thus, the second instance of the running software application can access the changes that had been propagated to the patch edition.

The genesis of the file system of the patch edition (e.g., file system $110_2$) is determined in a manner responsive to an analysis of the state of the initial run edition file system state, and the method describing how the file system (and its shadow) of the patch edition is established is the subject of this disclosure. Strictly as an example, analysis of the state of the initial run edition file system might consider the change log configuration history 111 and/or a patch history 113. There are many ways for a file system to change state including changes made by a system administrator, as well as via changes made by an application running in environment 1B00, and a log of such changes can be kept in one or both of the data structures of the change log configuration history 111 and/or a patch history 113.

"The Application"

A running installation of a suite of enterprise software applications comprises a vast and complex system made up of many individual parts that are broadly separated into a taxonomy as follows:

- A platform (e.g., storage hardware and software, servers, network components, OS, database hardware and software, middleware hardware and software, system management hardware and software, etc.), and
- One or more software applications (e.g., application code modules, application schema, code, application metadata, etc.)

Components within an installation can be further described as comprising:

- Application Schema: Application schema codifies a relational data model for accessing items stored in the application system 101 (e.g., tables, relationships, indexes, etc.). An instance of application schema defines the structure of the data being managed—it is not the data itself. The application schema is often managed while observing a two-layer approach comprising physical schema and logical schema:
  - The Physical Schema describes how information is actually stored in database tables.
  - The Logical Schema is a stable view of the relevant parts of the physical schema presented to the application code modules. The logical schema is often defined in terms of the physical schema using synonyms, views and access policies. In exemplary embodiments, the logical schema defines what is "seen" when an application code module connects to the relational data.
- Application Code Modules: These modules comprise executable logic that controls how the application operates. Instances of application code modules run on the database, middle-tier application servers, and in client devices. Application code modules can be written in a variety of programming and/or scripting languages.
- Application Metadata: This is data that participates in controlling how the application operates (e.g., initial look-and-feel, user customizations, etc.). This data can be stored in files on the files system, and/or in tables in a database. Metadata that is loaded into database tables is called "seed data". In some cases, metadata can be altered during application runtime. Users often edit application metadata to tailor functionality to their particular user-specific requirements.
- Business Data: This often refers to customer-owned transaction data or reference data that is stored in accordance with the application schema. Uses of patches as herein-described can modify how business data is stored (e.g., corresponding to an instance of an application schema), however the patching embodiments herein do not explicitly create or explicitly delete customer business data.

Application Editions

A collection of schema, code and metadata definitions comprise an application definition 140. Components of the application definition may need to change over time, and the techniques herein prescribe how each part of the application definition are to be versioned and patched independently. Therefore, an application definition in a particular installation is known by a compound "version ID" comprised of the union of the versions of all of its constituent parts. An installed collection of versioned part definitions is referred to as an Application Edition. In exemplary cases, an application definition is stored both on the file system and in the database. Further it is typical to store multiple Application Editions within one installation, and in such cases, both the file system and database are used to hold a run edition version and one or more patch edition versions of the application definition.

File System Editions

Figure 1C:
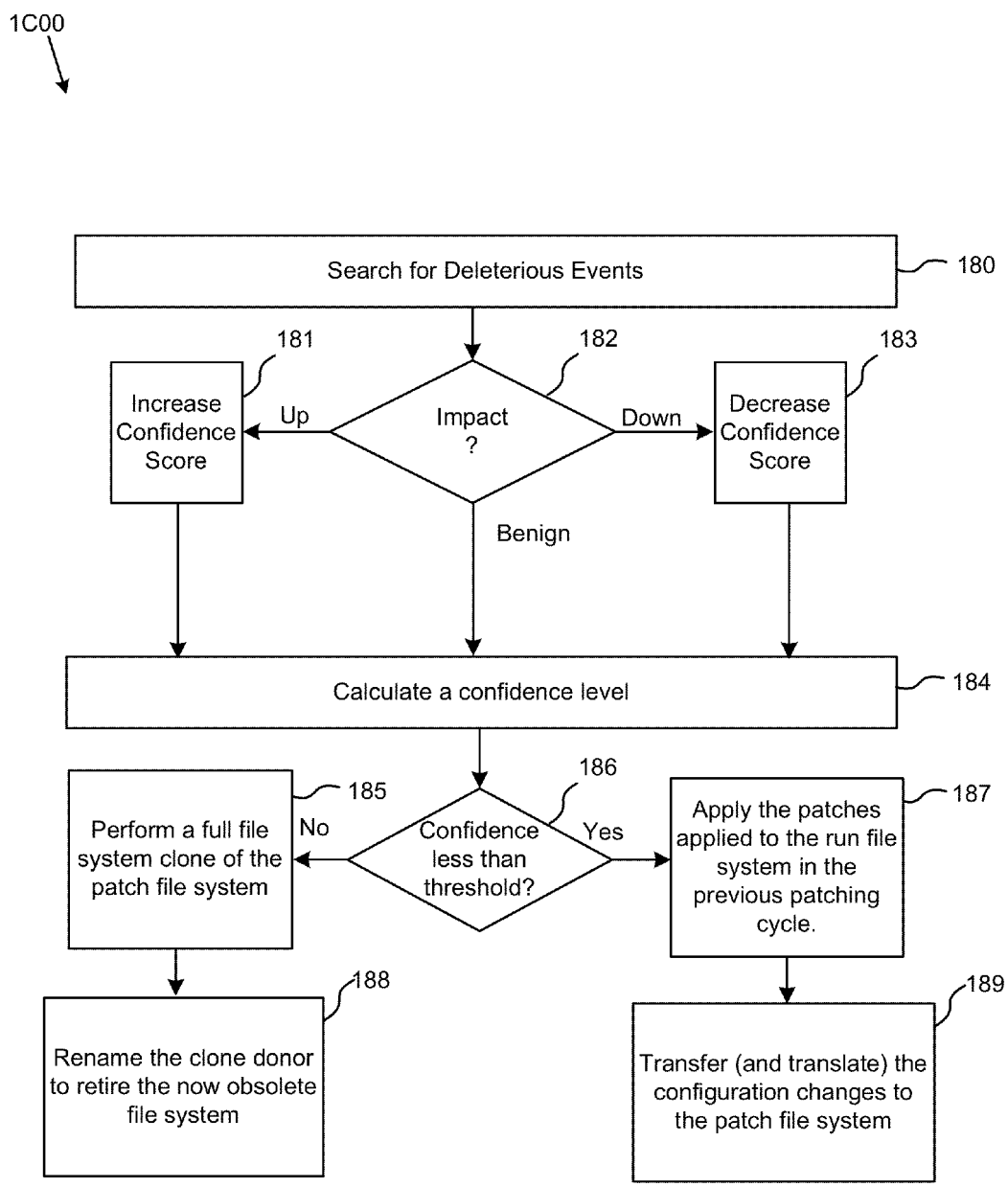
FIG. 1C is a diagram of a sample flow for analyzing a file system state to determine a confidence value, according to some embodiments.

A file system edition is a set of the files that make up an application definition. In some embodiments, there is a top level directory that contains an application system's file system artifacts. And, there may be another copy of similar contents in a directory separate from the top level directory File System Cloning Operations FIG. 1C is a diagram of a flow 1C00 for analyzing a file system state to determine a confidence score using environmental indications, according to some embodiments.

In addition to the factors considered as presented above (e.g., see FIG. 1A), other environmental factors can be considered, and can be characterized quantitatively inasmuch as a determination can be made to:

- upgrade a currently in-use file system, or to
- perform a full file system clone operation.

As shown, a process for implementing flow 1C00 might search for earlier-occurred events that would impact the confidence and decision-making. For example, operation 180 searches for recorded events such as a previously aborted patch cycle, or logged patch cycle SEVERE event or a logged patch cycle FAILURE event, or an administrative report of aberrant file system behavior when using one of the file systems (e.g. in a situation where maintenance efforts left unwanted effects).

In the situation that such events were discovered, the impact of those found events are assessed, and a determination is made as to the impact (see decision 182), which in turn might decrease the confidence score (see operation 183), or might increase the confidence score (see operation 181), or might be benign, and neither increase nor decrease the confidence score.

The calculated confidence score (see operation 184) is compared to a threshold (see operation 186), and if the confidence score is equal or greater than a threshold, then the flow 1C00 deems the current file system to be sufficient for use in the upgrade, and performs a full clone of the file system. In the case that the calculated confidence is less that a threshold, then the current file system deemed to be unsuitable for cloning to be used in the upgrade. Instead an earlier file system is selected (see operation 187) and a set of configuration changes are applied. In exemplary cases, timing, format and consistency checks are performed on the configuration changes before being applied (see operation 189).

In the context of the installation depicted in FIG. 1B, and the file system management of FIG. 1C, and following the purpose and definition of an edition and an edition's constituent components, a cycle can be followed so as to upgrade editions in a database system while maximizing the availability of the installation's functionality. Such an online patching cycle is discussed in further detail below.

Figure 2:
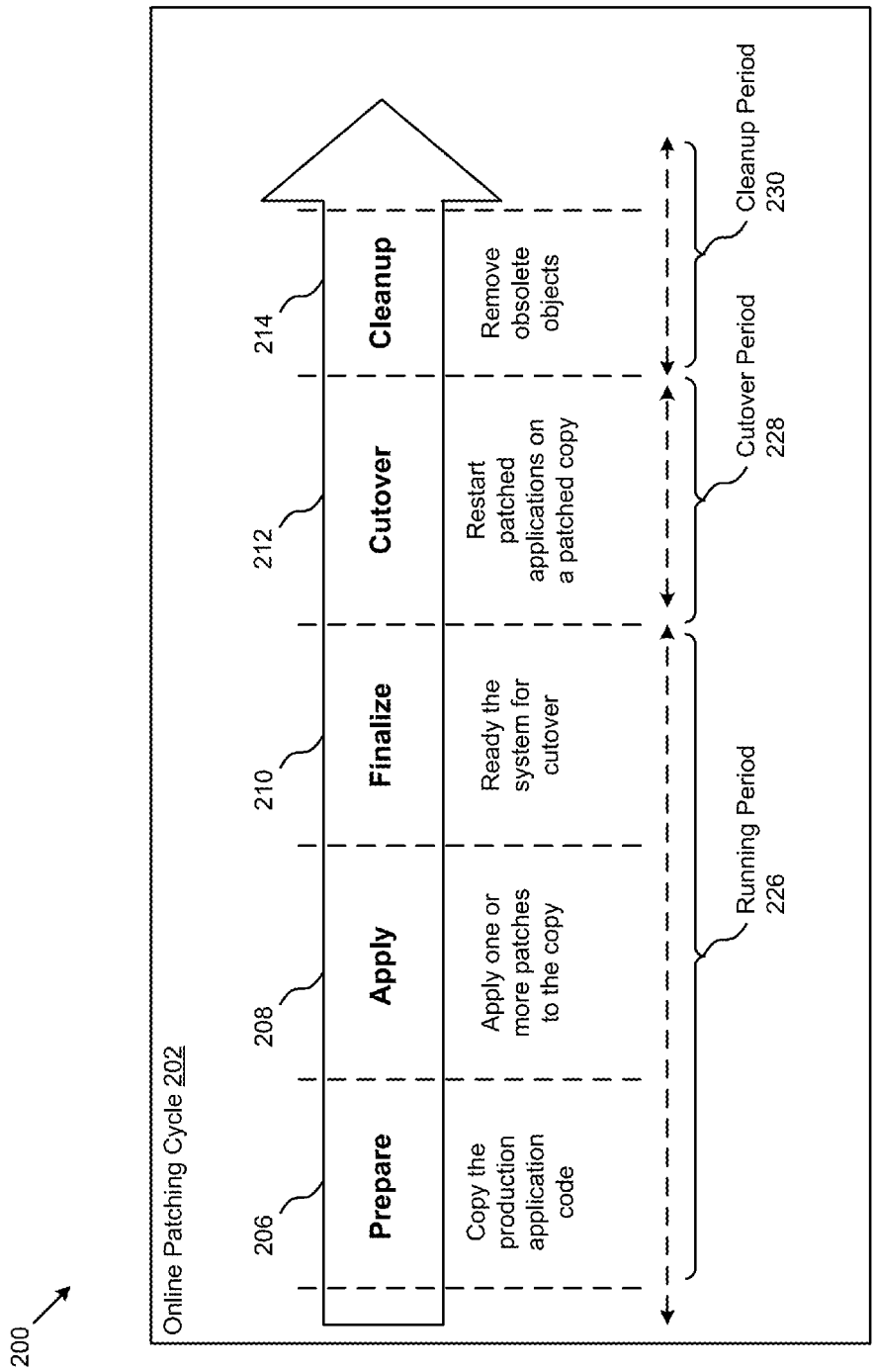
FIG. 2 is a cycle diagram showing an online patching cycle in which can be practiced techniques for analyzing a file system state to determine a promotion path during an online patching cycle, according to some embodiments.

FIG. 2 is a cycle diagram 200 showing an online patching cycle in which can be practiced techniques for analyzing a file system state to determine a promotion path during an online patching cycle. As an option, the present cycle diagram 200 may be implemented in the context of the architecture and functionality of the embodiments described herein. Also, the cycle diagram 200 or any aspect therein may be implemented in any desired environment.

To apply an online patch to an active/online installation, the installation is promoted through a series of sequential phases known as an online patching cycle. The shown online patching cycle 202 is given as:

PREPARE a patch edition (see online patch cycle prepare step 206). A patch edition as used in the context of the present disclosure will comprise a file system. The genesis of such a file system in the patch edition (e.g., file system $110_2$) is determined as being responsive to analysis of the state of the initial run edition file system state, and the method describing how the file system of the patch edition established is the subject of this disclosure.

APPLY a patch or patches to a patch edition (see online patch cycle apply step 208). Application of such patches can include operations to effect an "incremental code-level rebuild" and/or can include operations to effect an "incremental configuration-level rebuild". The decision of what file system to use as a baseline to which is applied code-level rebuild operations and/or configuration-level rebuild operations is based on flow 1A00.

FINALIZE to get the system ready for cutover (see online patch cycle finalize step 210).

CUTOVER to patch edition (see online patch cycle cutover step 212).
  Shutdown software applications and application services.
  Set patch edition as the new run edition.
  Startup software applications and application services.

CLEANUP old objects or editions (see online patch cycle cleanup step 214).

As described in the above cycle, creating and patching relies on many specialized techniques to maintain a run edition (e.g., initial run edition 106) and one or more patch editions (e.g., patch edition 120) in the presence of continuously changing customer data in database tables (e.g., in the business data 108). The concept and implementation of "Edition-Based Redefinition" creates patch edition copies of application code modules and data in order to continuously apply patch transformations to runtime data that changes while the patch is executing.

The users can be all online users during the normal operation (e.g., during the running period 226), then for the brief period of the cutover (e.g., during the cutover period 228) the users are offline, to return online (e.g., in cleanup period 230) shortly after conclusion of the period of the cutover.

One embodiment supports full installation online patching. Some installations comprise many products (e.g., hundreds of software application configurations, and many tens of thousands of tables). In such a case it is convenient to deploy every installation to contain all products (though only some may be licensed for a particular installation) and then to patch all products that are included in every installation. In this manner, all products can be periodically updated to stay current with the recommended code levels.

Implementing the above cycle to manage edition components for reducing downtime during upgrades relies in part on a particular configuration of an edition. An approach to forming such a particular configuration of an edition is discussed herein. More particularly, an approach to forming particular configurations of file systems (e.g., a patch edition file system, a shadow file system) for use in an editioned upgrade, and for use in successive upgrade cycles is discussed below.

Before discussing successive upgrade cycles it is instructive to provide further details of sample flow 1A00. Now, returning to the discussion of FIG. 1A, in the situation where the confidence level is below a threshold (see the "Yes" branch of decision 174), a shadow file system (e.g., a file system of known state) is selected to become the candidate file system (see operation 176), and some or all of the aforementioned scheduled operations (e.g., code-level rebuild operations, configuration-level rebuild operations) can be applied to the candidate file system, resulting in an upgraded file system having a known state. In the alternative, in the situation where the confidence level is equal or above a threshold (see the "No" branch decision 174), the initial run edition file system is selected to become the candidate file system (see operation 175), and some or all of the aforementioned scheduled operations (e.g., code-level rebuild operations, configuration-level rebuild operations, etc.) can be applied to the selected candidate file system (see operation 177), resulting in an upgraded file system having a known state at least to the degree of the confidence threshold. The patched candidate file system then becomes the subject of two operations:

Make a copy of the patched candidate file system and retain as a shadow file system (see operation 178), and
  Promote the candidate patched file system to become the file system $110_2$ in the patch edition (see operation 179).

The copy of the patched candidate file system and the promoted candidate patched file system are then used in successive upgrade cycles.

Some embodiments establish the aforementioned threshold on the basis of historical data. Other embodiments establish the threshold on the basis of one or more ratios. Still other embodiments establish the threshold on the basis of quantitative analysis performed during the progression of flow 1A00.

Figure 3:
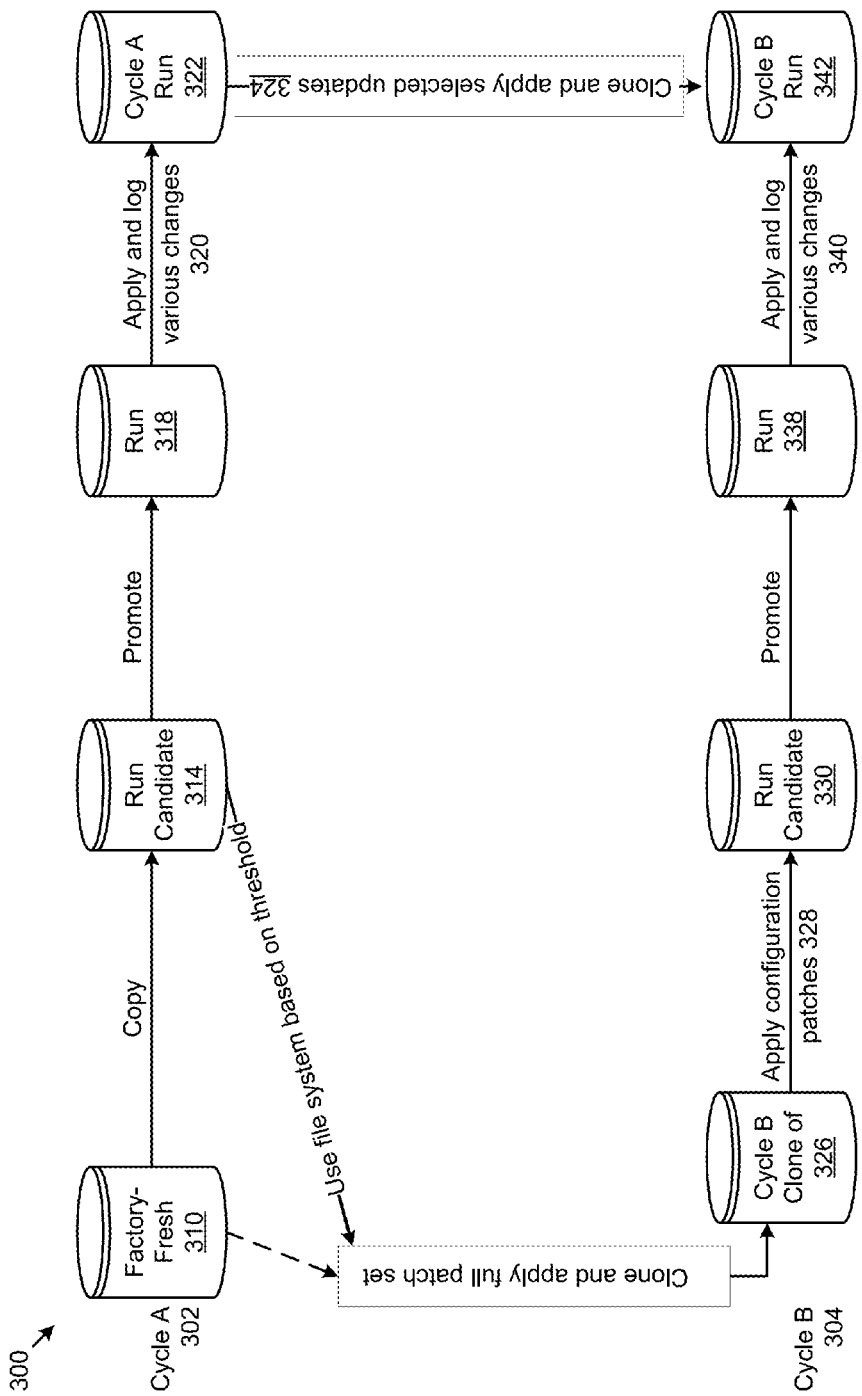
FIG. 3 is an upgrade cycle succession diagram depicting techniques for analyzing a file system state to determine a promotion path during an online patching cycle, according to some embodiments.

FIG. 3 is an upgrade cycle succession diagram 300 depicting techniques for analyzing a file system state to determine a promotion path during an online patching cycle. As an option, the present upgrade cycle succession diagram 300 may be implemented in the context of the architecture and functionality of the embodiments described herein. Also, the upgrade cycle succession diagram 300 or any aspect therein may be implemented in any desired environment.

As earlier described in the discussion of FIG. 1A, the sample flow 1A00 can result in the generation of two files systems, namely (1) a patched file system that is promoted to an instance in the patch edition, and (2) a copy of the patched candidate file system that is retained as a shadow file system. These two file systems are used in successive upgrade cycles. Various successive upgrade cycles and varied uses of the two files systems are shown and described in FIG. 3.

Strictly as examples, the upgrade cycle succession diagram 300 shows Cycle A 302, and Cycle B 304. Consider a factory-fresh file system 310 that is provided by a file system or application system vendor. A copy of that factory-fresh file system 310 is used (e.g., used or copied) to generate a run candidate file system 314, which is promoted to a run file system 318 (e.g., a file system $110_1$), which is in turn used in ongoing operations (e.g., within an initial run edition 106). Over time applications and/or system administrators might apply and/or log various changes (see operation 320) up until the beginning of an online patching cycle. At such a time, for example, within an online patch cycle prepare step 206, a flow commences (e.g., flow 1A00), and the given file system (e.g., Cycle A run file system 322) is deemed to be the candidate file system (see the operations of FIG. 1C) and selected updates (e.g., code patches, configuration changes, etc.) are applied (see operation 324) to generate a Cycle B run file system (e.g., cycle B run 342, as shown).

In an alternative scenario, the run file system 322 may have been deemed as having insufficient confidence to be used as a candidate run file system, and accordingly a previously saved known-state (e.g., shadow file system, or factory-fresh file system 310, or previously saved and un-modified run file system 314) is cloned (e.g., see clone 326) and process into a run candidate file system 330 for use in Cycle B by applying configuration changes (see operation 328). The candidate file system 330 is promoted to create a run candidate 338, which is used as the Cycle B run file system, and to which changes are made on an ongoing bases (see operation 340).

Considering the foregoing, and considering that an application system 101 can have a long lifespan, during which there can be many upgrade cycles, it becomes apparent that a file system can be advantageously subjected to a method for analyzing a file system state to determine a promotion path during an online patching cycle. The method can proceed by:
- identifying an initial run edition file system (e.g., a given file system) and a shadow file system, the shadow file system being older than the initial run file system;
- comparing a set of patch files to a portion of the initial run edition file system to collect comparison results (e.g., the comparing uses a patch history to determine a set of incremental software code patches to be scheduled for upgrading the initial run edition file system);
- analyzing a configuration history (e.g., a log file) to collect analysis results (e.g., the analyzing determines a set of incremental configuration values to be scheduled for upgrading the initial run edition file system);
- using the comparison results and the analysis results to determine a confidence score; and
- selecting the shadow file system to be upgraded when the confidence score is below a threshold; or
- selecting the initial run edition file system to be upgraded when the confidence score is equal or above a threshold.

Figure 4A:
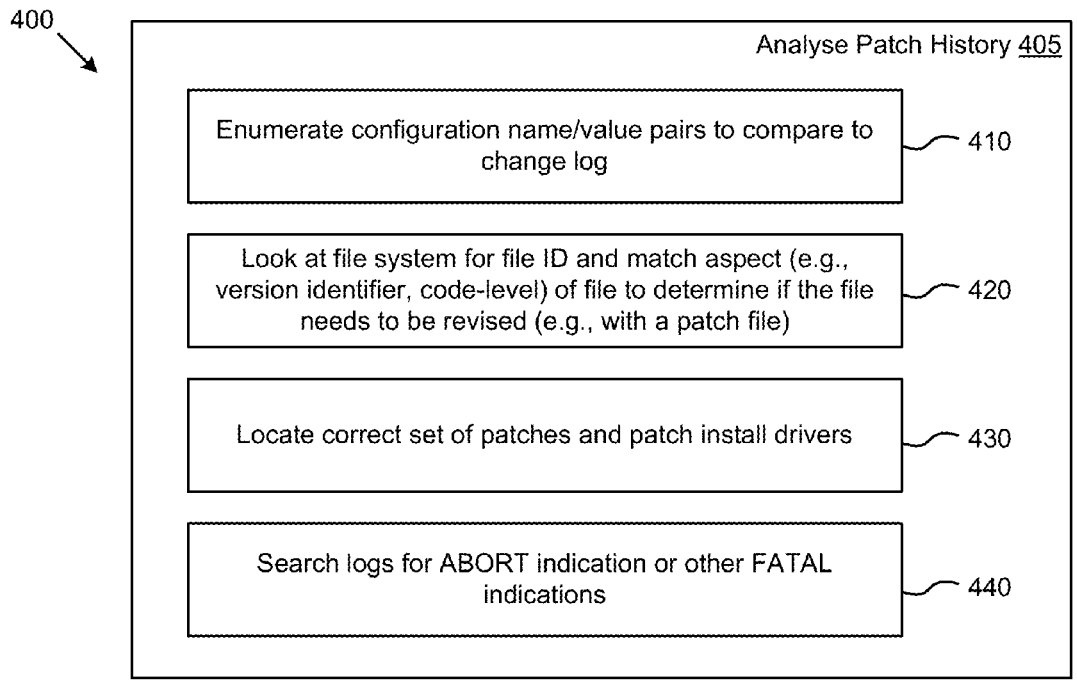
FIG. 4A is an operation chart depicting patch history analytics for analyzing a file system state to determine a promotion path during an online patching cycle, according to some embodiments.

FIG. 4A is an operation chart 400 depicting patch history analytics for analyzing a file system state to determine a promotion path during an online patching cycle. As an option, the present operation chart 400 may be implemented in the context of the architecture and functionality of the embodiments described herein. Also, the operation chart 400 or any aspect therein may be implemented in any desired environment.

In exemplary embodiments, a series of operations as shown in operation chart 400 are performed prior to or concurrent with the operations leading up to decision 163. As shown, the system to analyze patch history 405 serves to enumerate configuration name/value pairs and compares with the change log configuration history 111 (see operation 410). The system to analyze patch history 405 can also consider the file ID of any file in the file system, and can use such a file ID to determine if the file needs to be revised or upgraded or patched with a patch file (see operation 420). Responsive to the findings of operation 420, the system to analyze patch history 405 can locate a set of patches as well as locate a set of patch install drivers (see operation 430). In some situations, the change log configuration history 111 and/or a patch history 113 may contain an ABORT indication or other FATAL indication (see operation 440), in which case the confidence score might be imputed to a value such that the operation to select a shadow file system as a candidate file system (see operation 176) is performed.

Figure 4B:
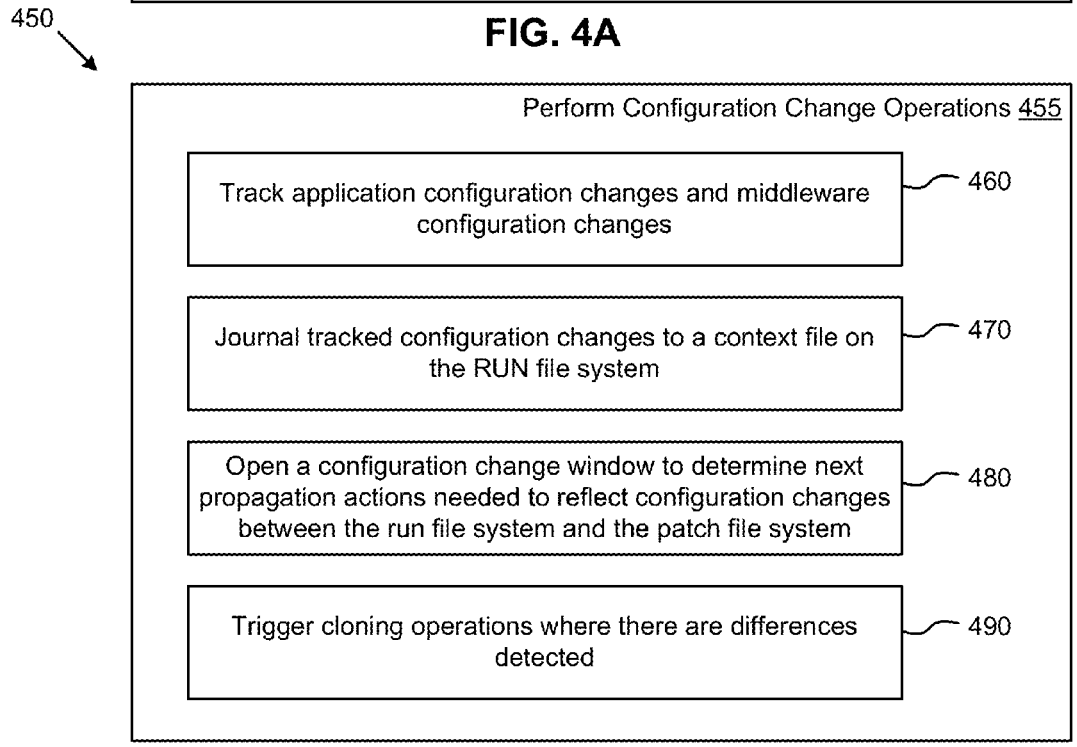
FIG. 4B is an operation chart depicting configuration change tracking for analyzing a file system state to determine a promotion path during an online patching cycle, according to some embodiments.

FIG. 4B is an operation chart 450 depicting configuration change tracking for analyzing a file system state to determine a promotion path during an online patching cycle. As an option, the present operation chart 450 may be implemented in the context of the architecture and functionality of the embodiments described herein. Also, the operation chart 450 or any aspect therein may be implemented in any desired environment.

In exemplary embodiments, the configuration change tracking of FIG. 4B can be performed through one or more steps (see steps to perform configuration change operations 455). Some embodiments include steps to:

- track application configuration changes and middleware configuration changes (see operation 460);
- journal tracked configuration changes to a context file on the RUN file system (see operation 470);
- open a configuration change window to determine next propagation actions needed to reflect configuration changes between the run file system and the patch file system (see operation 480); and
- trigger cloning operations where there are differences detected (see operation 490).

Figure 5A:
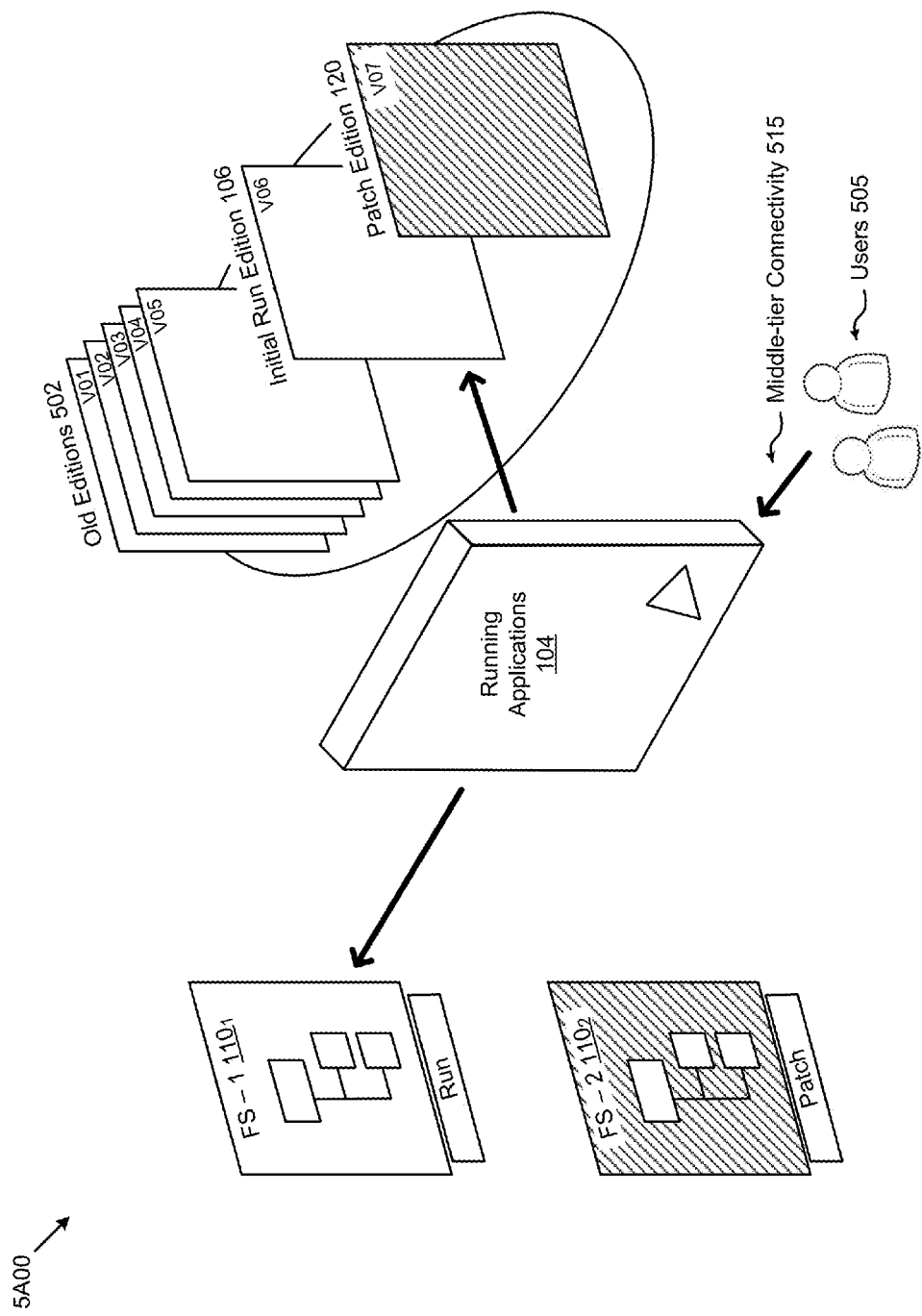
FIG. 5A is a sequence frame showing a running application accessing a file system in a multi-tier regime after analyzing a file system state to determine a promotion path during an online patching cycle, according to some embodiments.

FIG. 5A is a sequence frame 5A00 showing a running application accessing a file system in a multi-tier regime after analyzing a file system state to determine a promotion path during an online patching cycle. As an option, the present is a sequence frame 5A00 may be implemented in the context of the architecture and functionality of the embodiments described herein. Also, the sequence frame 5A00 or any aspect therein may be implemented in any desired environment.

The sequence frame 5A00 shows running software applications 104 in a multi-tier regime where users 505 connect to a run file system (e.g., the file system $110_1$) and connect to a database (e.g., within initial run edition 106) via a middle tier connectivity 515. The database may comprise an initial run edition 106, a patch edition 120, and any number of old editions 502.

The connectivity and user's connections using said connectivity can persist through the running period 226 even during the time that various operations involved in the prepare step 206, the apply step 208, and the finalize step 210 may be performed.

Figure 5B:
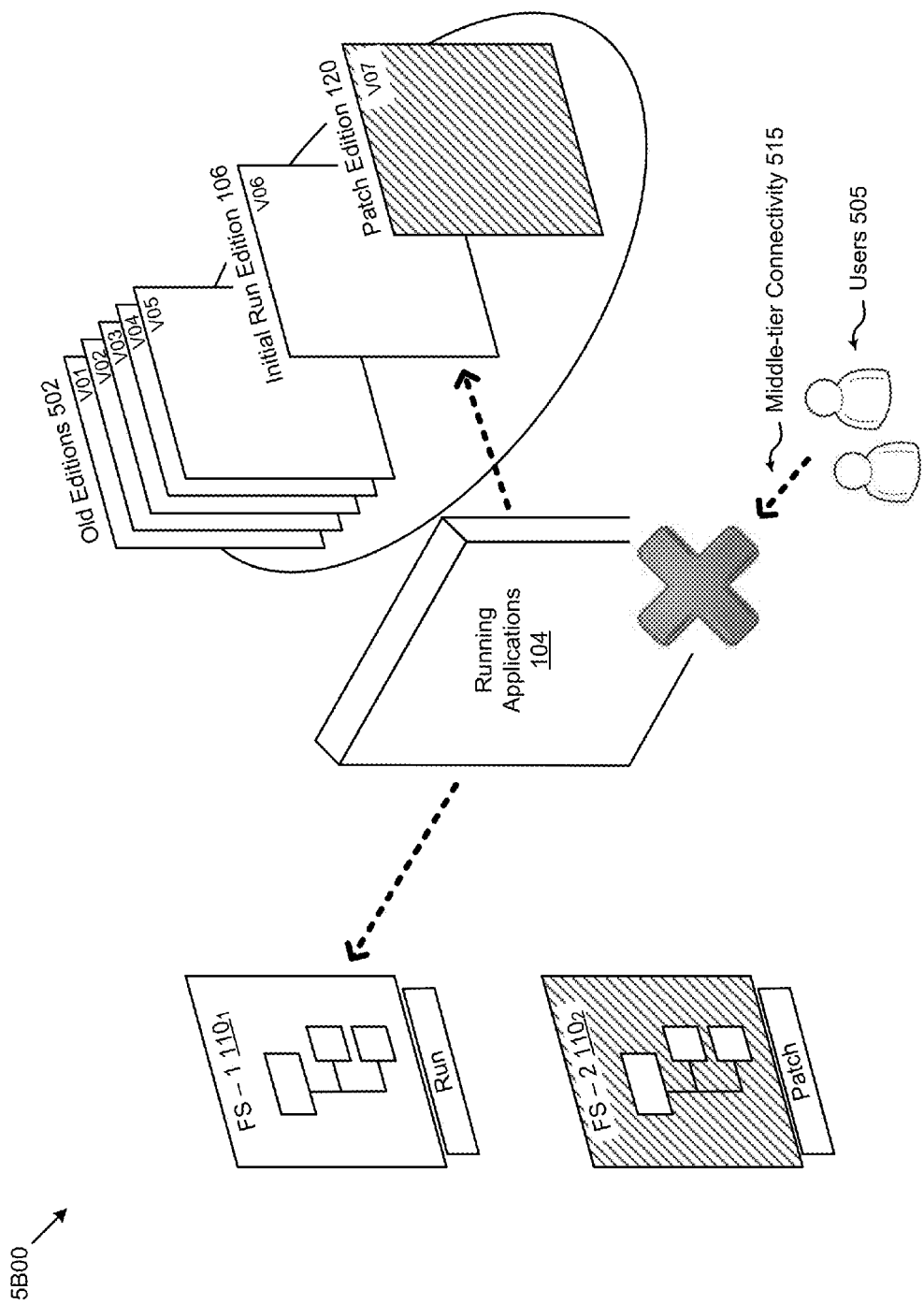
FIG. 5B is a sequence frame showing a disconnect operation in a multi-tier regime after analyzing a file system state to determine a promotion path during an online patching cycle, according to some embodiments.

FIG. 5B is a sequence frame 5B00 showing a disconnect operation in a multi-tier regime after analyzing a file system state to determine a promotion path during an online patching cycle. As an option, the present is a sequence frame 5B00 may be implemented in the context of the architecture and functionality of the embodiments described herein. Also, the sequence frame 5B00 or any aspect therein may be implemented in any desired environment.

The sequence frame 5B00 shows one embodiment of an orderly shutdown of running applications 104 in a multi-tier regime. In some instances, users 505 are advised to disconnect from the middle tier connectivity 515, and new connections are disallowed. Regardless of the lack of connections to the middle tier, various operations can persist through the running period 226 right up to the cutover period 228. During the running period 226 and through the cutover period 228 the database is not shutdown, and the file systems remain in existence and accessible. It is during this period that certain of the editioning operations can occur, including operations on file systems (e.g., following the flow 1A00).

At some moment during the running period, activity within the running applications and application services is quiesced in readiness for further online patch cycle operations (e.g., swap of file systems, and a restart of any patched applications and any patched application services).

Figure 5C:
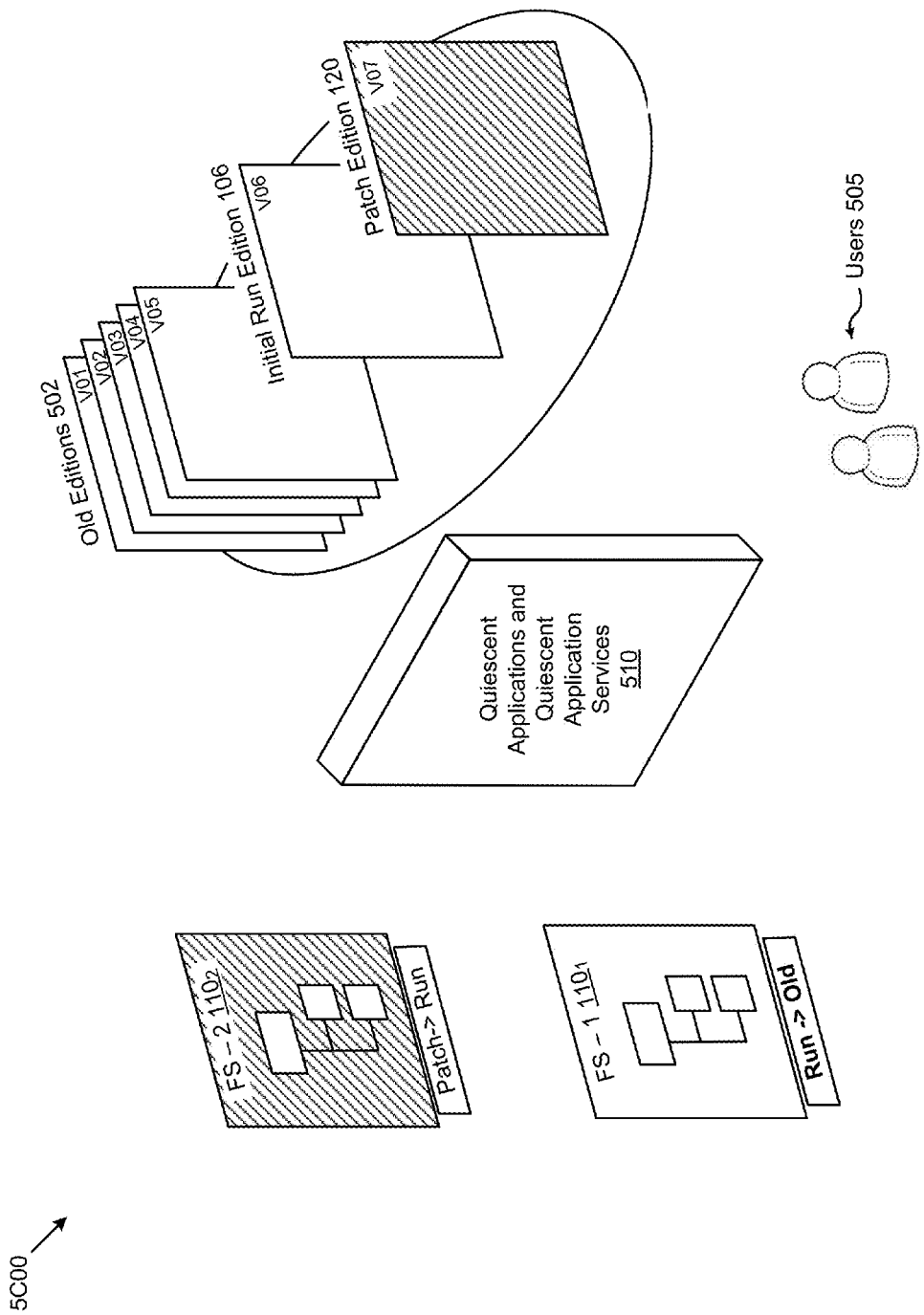
FIG. 5C is a sequence frame showing a file system swap operation in a multi-tier regime after analyzing a file system state to determine a promotion path during an online patching cycle, according to some embodiments.

FIG. 5C is a sequence frame 5C00 showing a file system swap operation in a multi-tier regime after analyzing a file system state to determine a promotion path during an online patching cycle. As an option, the present is a sequence frame 5C00 may be implemented in the context of the architecture and functionality of the embodiments described herein. Also, the sequence frame 5C00 or any aspect therein may be implemented in any desired environment.

As indicated in the discussion of FIG. 5B, at some moment during the running period, activity within the running applications is quiesced (see quiescent applications and quiescent application services 510) in readiness for further online patch cycle operations. One such operation serves to swap file systems 110 such that the former patched version of the file system becomes the current run file system.

Figure 5D:
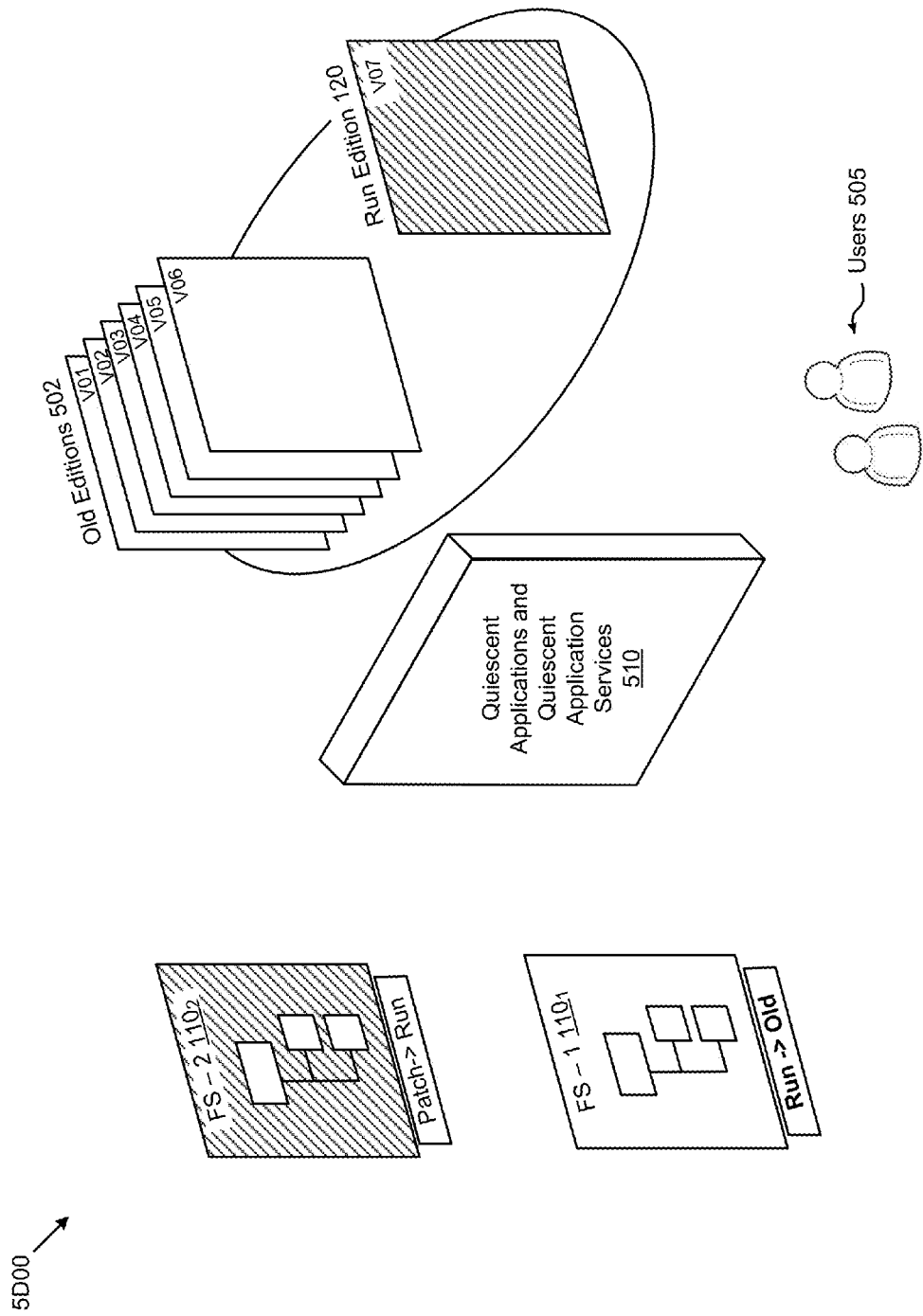
FIG. 5D is a sequence frame showing a patch edition promotion operation in a multi-tier regime after analyzing a file system state to determine a promotion path during an online patching cycle, according to some embodiments.

FIG. 5D is a sequence frame 5D00 showing a patch edition promotion operation in a multi-tier regime after analyzing a file system state to determine a promotion path during an online patching cycle. As an option, the present is a sequence frame 5D00 may be implemented in the context of the architecture and functionality of the embodiments described herein. Also, the sequence frame 5D00 or any aspect therein may be implemented in any desired environment.

Again, as indicated in the discussion of FIG. 5B, at some moment during the running period, activity within the running applications is quiesced in readiness for further online patch cycle operations. One such operation serves promote file systems such that the former patch edition file system becomes the current run edition file system.

Figure 5E:
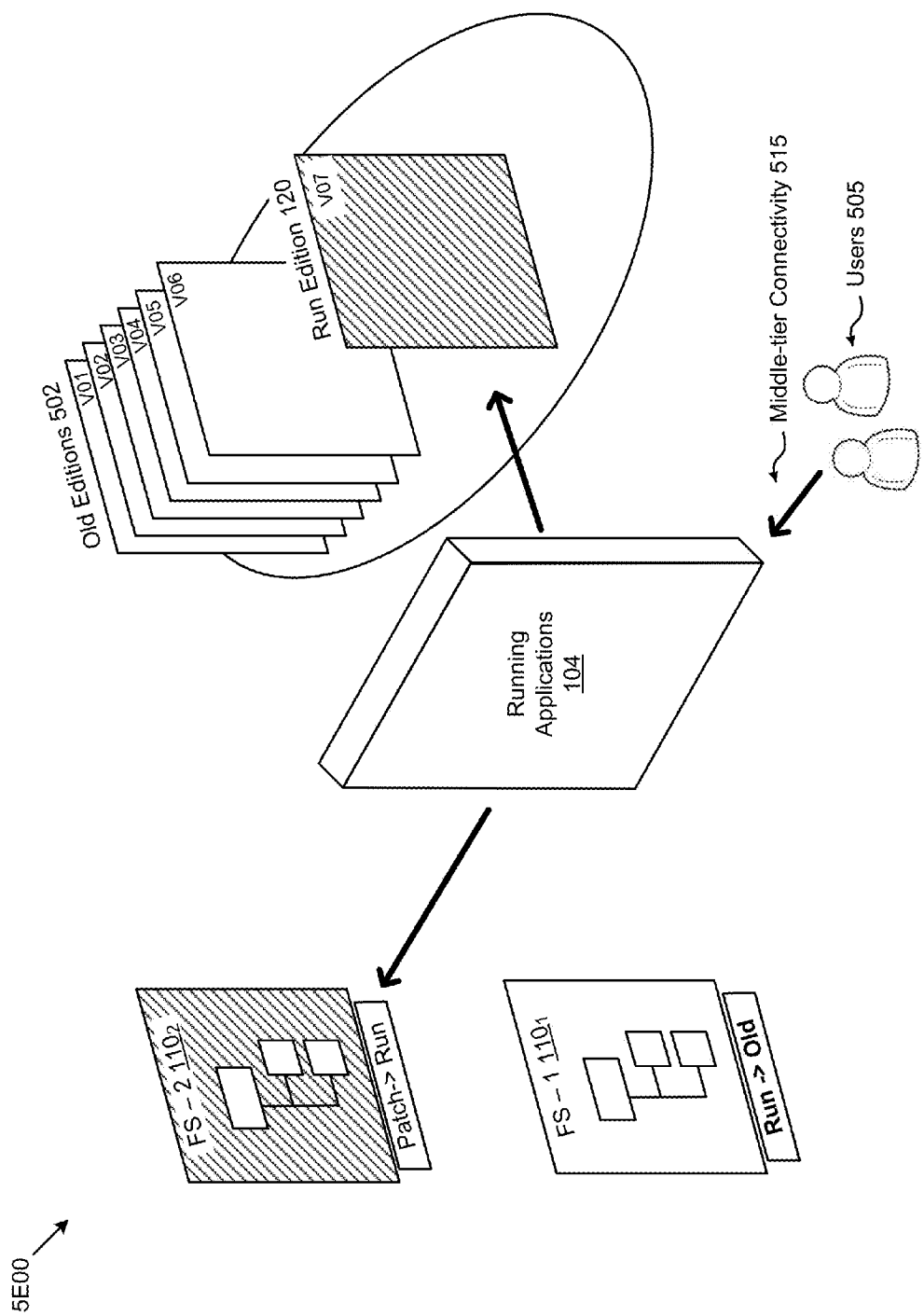
FIG. 5E is a sequence frame showing a reconnection operation in a multi-tier regime after analyzing a file system state to determine a promotion path during an online patching cycle, according to some embodiments.

FIG. 5E is a sequence frame 5E00 showing a reconnection operation in a multi-tier regime after analyzing a file system state to determine a promotion path during an online patching cycle. As an option, the present is a sequence frame 5E00 may be implemented in the context of the architecture and functionality of the embodiments described herein. Also, the sequence frame 5E00 or any aspect therein may be implemented in any desired environment.

The depiction of sequence frame 5E00 shows the state of the installation at a point in time during the cutover period. The middle tier now refers to the patched file system FS-2 (e.g., file system $110_2$), and refers to the promoted, patch edition 120 (see v07) which are now prepared to become the online version to be accessed by any patched applications and any patched application services, and are now prepared to become the online version to be accessed by users 505.

Figure 6:
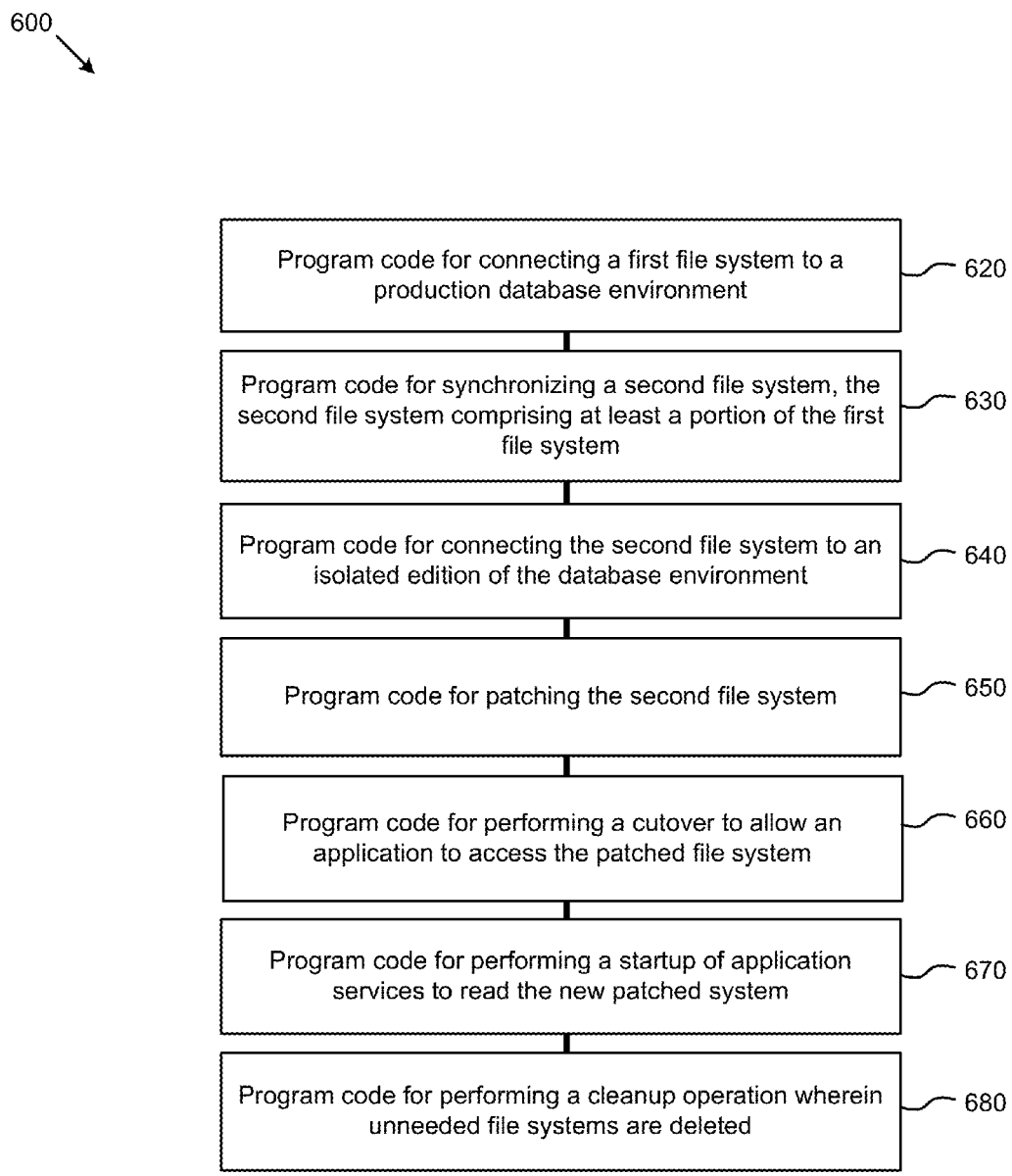
FIG. 6 system for implementing aspects of an editioned file system within an editioned database system in which can be practiced analyzing a file system state to determine a promotion path during an online patching cycle, according to some embodiments.

FIG. 6 shows a system 600 for implementing aspects of an editioned file system within an editioned database system in which can be practiced analyzing a file system state to determine a promotion path during an online patching cycle. As an option, the present system 600 may be implemented in the context of the architecture and functionality of the embodiments described herein. Also, the system 600 or any aspect therein may be implemented in any desired environment.

As shown, the system 600 is implemented as a series of program code modules configured to perform method steps using a processor, the method comprising:

Connecting a first file system to a production database environment (see operation 620)

Synchronizing a second file system, the second file system comprising at least a portion of the first file system (see operation 630)

Connecting the second file system to an isolated edition of the database environment (see operation 640)

Patching the second file system (see operation 650)

performing a cutover to allow an application to access the patched file system (see operation 660)

Performing a startup of application services to read the new patched system (see operation 670)

Performing a cleanup operation where unneeded file systems are deleted (see operation 680)

ADDITIONAL EMBODIMENTS OF THE DISCLOSURE

Figure 7:
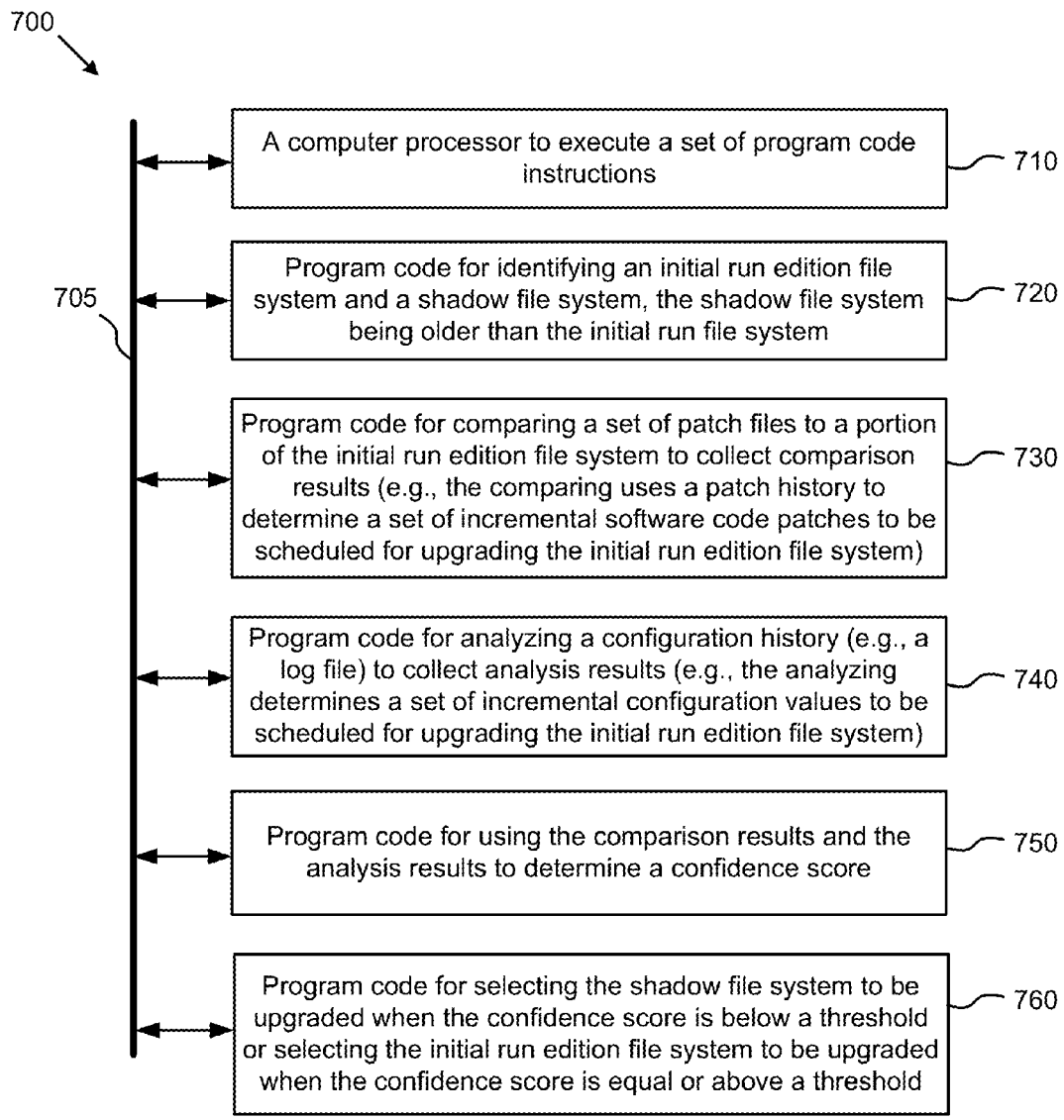
FIG. 7 depicts a block diagram of a computer system for analyzing a file system state to determine a promotion path during an online patching cycle, according to some embodiments.

FIG. 7 depicts a block diagram of a system to perform certain functions of a computer system for analyzing a file system state to determine a promotion path during an online patching cycle. As an option, the present system 700 may be implemented in the context of the architecture and functionality of the embodiments described herein. Of course, however, the system 700 or any operation therein may be carried out in any desired environment. As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: identifying an initial run edition file system and a shadow file system, the shadow file system being older than the initial run file system (see module 720); comparing a set of patch files to a portion of the initial run edition file system to collect comparison results (see module 730) such as where the comparing uses a patch history to determine a set of incremental software code patches to be scheduled for upgrading the initial run edition file system; analyzing a configuration history (e.g., a log file, configuration logs, etc.) to collect analysis results, such as where the analyzing determines a set of incremental configuration values to be scheduled for upgrading the initial run edition file system (see module 740); using the comparison results and the analysis results to determine a confidence score (see module 750); and selecting the shadow file system to be upgraded when the confidence score is below a threshold or selecting the initial run edition file system to be upgraded when the confidence score is equal or above a threshold (see module 760).

Figure 8:
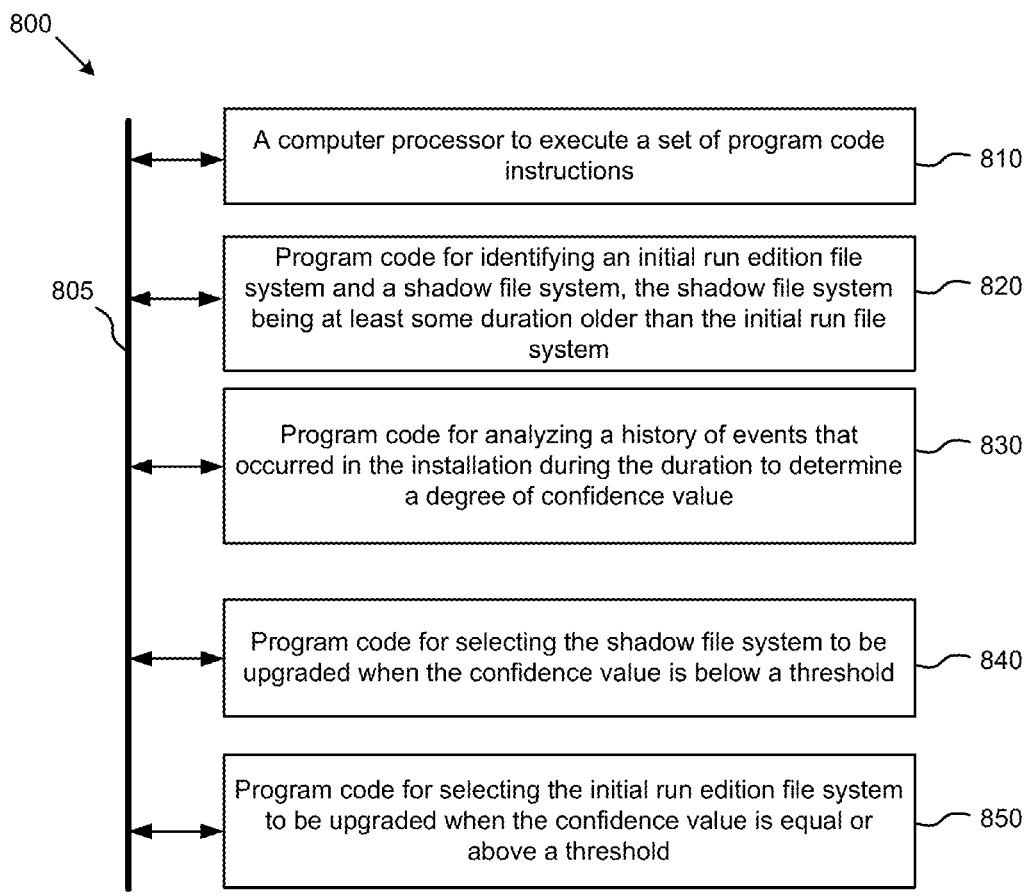
FIG. 8 depicts a system for analyzing a file system state to determine a promotion path during an online patching cycle, according to some embodiments.

FIG. 8 depicts a system for analyzing a file system state to determine a promotion path during an online patching cycle. As an option, the present system 800 may be implemented in the context of the architecture and functionality of the embodiments described herein. Of course, however, the system 800 or any operation therein may be carried out in any desired environment. As shown, system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The embodiment of FIG. 8 implements a portion of a computer system, shown as system 800, comprising a computer processor to execute a set of program code instructions (see module 810) and modules for accessing memory to hold program code instructions to perform: identifying an initial run edition file system and a shadow file system, the shadow file system being at least some duration older than the initial run file system (see module 820); analyzing a history of events that occurred in the installation during the duration to determine a degree of confidence value (see module 830); and selecting the shadow file system to be upgraded when the confidence value is below a threshold (see operation 840) or selecting the initial run edition file system to be upgraded when the confidence value is equal or above a threshold (see module 850).

System Architecture Overview

Figure 9:
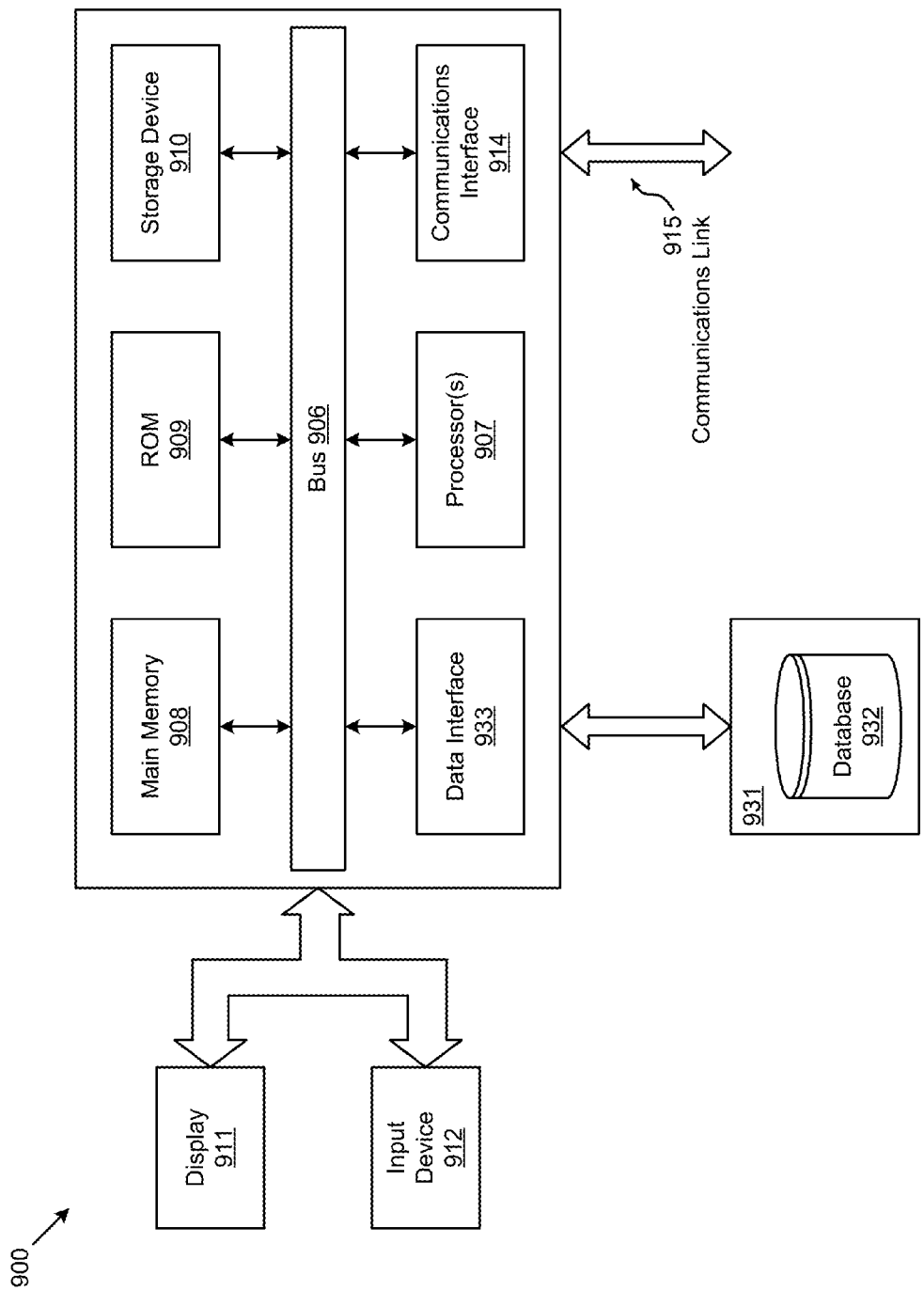
FIG. 9 depicts a block diagram of an instance of a computer system suitable for implementing an embodiment of the present disclosure.

FIG. 9 depicts a block diagram of an instance of a computer system 900 suitable for implementing an embodiment of the present disclosure. Computer system 900 includes a bus 906 or other communication mechanism for communicating information, which interconnects subsystems and devices, such as a processor 907, a system memory 908 (e.g., RAM), a static storage device (e.g., ROM 909), a disk drive 910 (e.g., magnetic or optical), a data interface 933, a communication interface 914 (e.g., modem or Ethernet card), a display 911 (e.g., CRT or LCD), input devices 912 (e.g., keyboard, cursor control), and an external data repository 931.

According to one embodiment of the disclosure, computer system 900 performs specific operations by processor 907 executing one or more sequences of one or more instructions contained in system memory 908. Such instructions may be read into system memory 908 from another computer readable/usable medium, such as a static storage device or a disk drive 910. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 900. According to certain embodiments of the disclosure, two or more computer systems 900 coupled by a communications link 915 (e.g., LAN, PTSN, or wireless network) may perform the sequence of instructions required to practice the disclosure in coordination with one another.

Computer system 900 may transmit and receive messages, data, and instructions, including programs (e.g., application code), through communications link 915 and communication interface 914. Received program code may be executed by processor 907 as it is received, and/or stored in disk drive 910 or other non-volatile storage for later execution. Computer system 900 may communicate through a data interface 933 to a database 932 on an external data repository 931. A module as used herein can be implemented using any mix of any portions of the system memory 908, and any extent of hard-wired circuitry including hard-wired circuitry embodied as a processor 907.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for analyzing an installation to determine a file system promotion path during an online patching cycle, the method comprising:
   identifying an initial run edition file system and a shadow file system, the shadow file system being at least some duration older than the initial run edition file system;
   analyzing a history of changes that are applied to an installation of the initial run edition file system during the at least some duration to determine whether the changes cause instability for the initial run edition file system when an upcoming upgrade is applied to the initial run edition file system;
   storing, at a first location of a non-transitory computer readable storage medium, a result of determining whether the changes cause instability as a confidence value;
   determining whether to select the shadow file system or the initial run edition file system to be upgraded based in part or in whole upon the confidence value;
   selecting the shadow file system to be upgraded with the upcoming upgrade when the confidence value is below a threshold; and
   selecting the initial run edition file system to be upgraded with the upcoming upgrade when the confidence value is equal or above the threshold.

2. The method of claim 1, further comprising applying incremental code-level rebuild operations to the selected shadow file system.

3. The method of claim 1, further comprising applying scheduled incremental configuration-level rebuild operations to the selected shadow file system.

4. The method of claim 1, further comprising setting the confidence value to a value below the threshold when an abort indication is detected or when a previous upgrade operation failure indication is detected.

5. The method of claim 1, further comprising:
   identifying a first data structure stored at a first location in memory for a configuration history;
   identifying a second data structure stored at a second location in memory for an upgrade or patch history;
   identifying identifications of a plurality of files in the initial run edition file system;
   determining whether one or more files in the plurality of files are to be revised by using at least one or more identifications of the identifications;
   locating a set of patches and a set of install drivers in response to a determination of whether the one or more files in the plurality of files are to be revised;
   determining whether the first data structure or the second data structure includes an indication that imputes the confidence value to a predetermined value;
   analyzing the first data structure and the second data structure to determine whether the first data structure or the second data structure includes one or more changes;

classifying the one or more changes into one or more classifications including a don't care or override classification, a benign classification, and an unknown classification;

determining respective impacts of the one or more changes on the confidence value;

determining whether a system state of the initial run edition file system is ascertained;

determining the confidence value based in part or in whole upon the one or more classifications, and a determination concerning the system state;

determining whether the initial run edition file system or the shadow file system is to be upgraded or whether a file system clone operation is to be performed by calculating a confidence score based in part or in whole upon one or more environmental indications;

comparing the confidence score with a threshold score to generate and store a confidence score comparison result;

upgrading the initial run edition file system or the shadow file system when the confidence score is determined to be greater than or equal to the threshold score; and performing the file system clone operation without upgrading the initial run edition file system or the shadow file system when the confidence score is determined to be less than the threshold score.

6. The method of claim 1, further comprising reading a patch list for analyzing the history of changes.

7. The method of claim 1, further comprising determining the threshold based at least in part on a ratio.

8. A computer system for analyzing an installation to determine a file system promotion path during an online patching cycle, comprising:

a computer processor to execute a set of program code instructions; and a memory to hold the program code instructions, in which the program code instructions comprises program code which, when executed by the computer processor, causes the computer processor to:

identify an initial run edition file system and a shadow file system, the shadow file system being at least some duration older than the initial run edition file system;

analyze a history of changes that are applied to the initial run edition file system during the at least some duration to determine whether the changes cause instability for the initial run edition file system when an upcoming upgrade is applied to the initial run edition file system;

store, at a first location of the memory, a result of determining whether the changes cause instability as a confidence value;

determine whether to select the shadow file system or the initial run edition file system to be upgraded based in part or in whole upon the confidence value;

select the shadow file system to be upgraded with the upcoming upgrade when the confidence value is below a threshold; and select the initial run edition file system to be upgraded with the upcoming upgrade when the confidence value is equal or above the threshold.

9. The computer system of claim 8, the program code instruction further comprising program code which, when executed by the computer processor, further causes the computer processor to apply incremental code-level rebuild operations to the shadow file system.

10. The computer system of claim 8, the program code instruction further comprising program code which, when executed by the computer processor, further causes the computer processor to apply scheduled incremental configuration-level rebuild operations to the shadow file system.

11. The computer system of claim 8, the program code instruction further comprising program code which, when executed by the computer processor, further causes the computer processor to set the confidence value to a value below the threshold when an abort indication is detected or when a previous upgrade operation failure indication is detected.

12. The computer system of claim 8, the program code instruction comprising program code that causes the computer processor to analyze the history of events further comprises program code which, when executed by the computer processor, further causes the computer processor to read a log file.

13. The computer system of claim 8, the program code instruction comprising program code that causes the computer processor to analyze the history of events further comprises program code which, when executed by the computer processor, further causes the computer processor to read a patch list.

14. The computer system of claim 8, the program code instruction comprising the program code which, when executed by the computer processor, further causes the computer processor to determine the threshold based at least in part on a ratio.

15. A computer program product embodied in a non-transitory computer readable medium, the non-transitory computer readable medium having stored thereon a sequence of instructions which, when executed by a processor causes the processor to execute a set of acts to implement analyzing an installation to determine a file system promotion path during an online patching cycle, the set of acts comprising:

identifying an initial run edition file system and a shadow file system, the shadow file system being at least some duration older than the initial run edition file system;

analyzing a history of changes that are applied to the initial run edition file system during the at least some duration to determine whether the changes cause instability for the initial run edition file system when an upcoming upgrade is applied to the initial run edition file system;

store, at a first location of the memory, a result of determining whether the changes cause instability as a confidence value;

determining whether to select the shadow file system or the initial run edition file system to be upgraded based in part or in whole upon the confidence value;

selecting the shadow file system to be upgraded with the upcoming upgrade when the confidence value is below a threshold; and selecting the initial run edition file system to be upgraded with the upcoming upgrade when the confidence value is equal or above the threshold.

16. The computer program product claim 15, the set of acts further comprising applying incremental code-level rebuild operations to the shadow file system.

17. The computer program product of claim 15, the set of acts further comprising applying scheduled incremental configuration-level rebuild operations to the shadow file system.

18. The computer program product of claim 15, the set of acts further comprising setting the confidence value to a value below the threshold when an abort indication is detected or when a previous upgrade operation failure indication is detected.

19. The computer program product of claim 15, the set of acts further comprising reading a log file or a patch list for analyzing the history of changes.

20. The computer program product of claim 15, the set of acts further comprising determining the threshold based at least in part on a ratio.

* * * * *